(12) United States Patent
Dagher et al.

(10) Patent No.: US 8,824,833 B2
(45) Date of Patent: Sep. 2, 2014

(54) IMAGE DATA FUSION SYSTEMS AND METHODS

(75) Inventors: Joseph C. Dagher, Boulder, CO (US); Amit Ashok, Boulder, CO (US); David Tremblay, Boulder, CO (US); Kenneth S. Kubala, Boulder, CO (US)

(73) Assignee: OmniVision Technologies, Inc., Santa Clara, CA (US)

( * ) Notice: Subject to any disclaimer, the term of this patent is extended or adjusted under 35 U.S.C. 154(b) by 380 days.

(21) Appl. No.: 12/865,343

(22) PCT Filed: Jan. 30, 2009

(86) PCT No.: PCT/US2009/032683
§ 371 (c)(1),
(2), (4) Date: Nov. 29, 2010

(87) PCT Pub. No.: WO2009/097552
PCT Pub. Date: Aug. 6, 2009

(65) Prior Publication Data
US 2011/0064327 A1 Mar. 17, 2011

(51) Int. Cl.
*G06K 9/32* (2006.01)
*G06T 5/00* (2006.01)
*G06T 5/50* (2006.01)

(52) U.S. Cl.
CPC . *G06T 5/50* (2013.01); *G06T 5/004* (2013.01); *G06T 2207/20221* (2013.01); *G06T 2207/10148* (2013.01)
USPC .......................................... 382/294; 382/260

(58) Field of Classification Search
CPC .............................................. G06T 2207/20221
See application file for complete search history.

(56) References Cited

U.S. PATENT DOCUMENTS

| | | | |
|---|---|---|---|
| 5,130,794 A * | 7/1992 | Ritchey | 348/39 |
| 5,172,236 A | 12/1992 | Takemoto et al. | |
| 5,282,045 A | 1/1994 | Mimura et al. | |
| 5,771,416 A * | 6/1998 | Mukai et al. | 396/378 |
| 6,128,416 A * | 10/2000 | Oura | 382/284 |
| 6,201,899 B1 | 3/2001 | Bergen | |
| 6,654,013 B1 * | 11/2003 | Malzbender et al. | 345/426 |
| 6,856,708 B1 | 2/2005 | Aoki | |
| 7,274,830 B2 | 9/2007 | Bacarella et al. | |

(Continued)

OTHER PUBLICATIONS

Snavely et al., "Photo Tourism: Exploring photo collections in 3D," ACM Transactions on Graphics, 25(3), Aug. 2006.*

(Continued)

*Primary Examiner* — Bhavesh Mehta
*Assistant Examiner* — Andrew Moyer
(74) *Attorney, Agent, or Firm* — Lathrop & Gage LLP

(57) ABSTRACT

Systems and methods for image data fusion include providing first and second sets of image data corresponding to an imaged first and second scene respectively. The scenes at least partially overlap in an overlap region, defining a first collection of overlap image data as part of the first set of image data, and a second collection of overlap image data as part of the second set of image data. The second collection of overlap image data is represented as a plurality of image data subsets such that each of the subsets is based on at least one characteristic of the second collection, and each subset spans the overlap region. A fused set of image data is produced by an image processor, by modifying the first collection of overlap image data based on at least a selected one of, but less than all of, the image data subsets.

39 Claims, 18 Drawing Sheets

(56) References Cited

U.S. PATENT DOCUMENTS

| | | | |
|---|---|---|---|
| 2001/0045982 | A1 | 11/2001 | Okisu et al. |
| 2002/0140823 | A1 | 10/2002 | Sakurai et al. |
| 2003/0026588 | A1* | 2/2003 | Elder et al. ............. 386/46 |
| 2004/0047518 | A1 | 3/2004 | Tiana |
| 2004/0080661 | A1 | 4/2004 | Afsenius |
| 2004/0105569 | A1* | 6/2004 | Sharma et al. ............. 382/100 |
| 2004/0234154 | A1* | 11/2004 | Hier ............. 382/254 |
| 2005/0248590 | A1* | 11/2005 | Tian et al. ............. 345/660 |
| 2006/0050338 | A1* | 3/2006 | Hattori ............. 359/9 |
| 2006/0061678 | A1 | 3/2006 | Yamazaki |
| 2007/0188601 | A1* | 8/2007 | Rohaly et al. ............. 348/47 |
| 2007/0247517 | A1 | 10/2007 | Zhang et al. |
| 2008/0056612 | A1* | 3/2008 | Park et al. ............. 382/284 |
| 2008/0218613 | A1* | 9/2008 | Janson et al. ............. 348/262 |
| 2011/0019048 | A1 | 1/2011 | Raynor et al. |

OTHER PUBLICATIONS

Bao and Xu, "Complex wavelet-based image mosaics using edge-preserving visual perception modeling," Computers & Graphics 23.3 (1999): 309-321.*

Brown and Lowe, "Recognising panoramas," Proceedings of the Ninth IEEE International Conference on Computer Vision, vol. 2, No. 1218-1225, 2003.*

Klarquist and Bovik, "Fovea: A foveated vergent active stereo vision system for dynamic three-dimensional scene recovery," Robotics and Automation, IEEE Transactions on 14.5 (1998): 755-770.*

Kuhnlenz et al., "A multi-focal high-performance vision system," Robotics and Automation, 2006. ICRA 2006, Proceedings 2006 IEEE International Conference on, IEEE, 2006.*

Scassellati, "A binocular, foveated active vision system," No. AI-M-1628, Massachusetts Inst of Tech Cambridge Artificial Intelligence Lab, 1999.*

Zhao et al., "Broadband and wide field of view foveated imaging system in space," Optical Engineering 47.10 (2008): 103202-103202.*

Wikipedia, http://en.wikipedia.org/wiki/Image_scaling, Jan. 29, 2007.*

Drori, Iddo, and Dani Lischinski. "Fast multiresolution image operations in the wavelet domain." Visualization and Computer Graphics, IEEE Transactions on 9.3 (2003): 395-411.*

Hill, Paul R., Cedric Nishan Canagarajah, and David R. Bull. "Image fusion using complex wavelets." BMVC. 2002.*

International Search Report and Written Opinion issued in related PCT patent application PCT/US2009/032683, dated Jan. 30, 2009, 14 pages.

Kiyoharu, et al., "Producing Object-Based Special Effects by Fusing Multiple Differently Focused Images," IEEE Transactions on Circuits and Systems for Video Technology, IEEE Service Center, vol. 10, No. 2, Mar. 1, 2000.

Kazuya, et al., "All-in-Focus Image Generation by Merging Multiple Differently Focused Images in Three-Dimensional Frequency Domain" Advances in Multimedia Information Processing—PCT 2005 Lecture Notes in Computer Science, vol. 3767, pp. 303-314, Jan. 1, 2005.

Hong, Sahyun, et al. "Data Fusion of Multiple Polarimetriv SAR Images Using Discrete Wavelet Transform (DWT)" IEEE, 3323-3325, 2002.

Office Action issued in related Taiwanese Patent Application 098103287 dated Jan. 9, 2013, 29 pages.

U.S. Appl. No. 13/281,674 Office Action issued Sep. 10, 2013, 28 pages.

U.S. Appl. No. 13/281,674 Response to Office Action filed Dec. 10, 2013, 9 pages.

* cited by examiner

US 8,824,833 B2

IMAGE DATA FUSION SYSTEMS AND METHODS

CROSS-REFERENCE TO RELATED APPLICATIONS

This application claims priority to U.S. Provisional Patent application No. 61/025,533, filed on 1 Feb. 2008 and entitled MULTI-FOCAL LENGTH IMAGE FUSION, U.S. Provisional Patent application No. 61/051,338, filed 7 May 2008 and entitled TRANSFORM DOMAIN REGISTRATION FOR IMAGE FUSION, and U.S. Provisional Patent application No. 61/059,319, filed 6 Jun. 2008 and entitled TRANSFORM DOMAIN REGISTRATION FOR IMAGE FUSION. All of the above-identified applications are incorporated herein by reference in their entireties.

BACKGROUND

Small, digital cameras integrated into mobile electronics such as mobile phones, personal digital assistants ("PDAs") and music players are becoming ubiquitous. Each year, mobile phone manufacturers add more imaging features to their handsets, causing these mobile imaging devices to converge towards feature sets that consumers expect from stand-alone digital still cameras. At the same time, the size of these handsets is shrinking, making it necessary to accordingly reduce the total size of the camera modules while still adding imaging features. Optical zoom is a primary feature that many digital still cameras have that many mobile phones may not have, primarily due to the severe size constraints in mobile imaging devices.

Cameras (including digital cameras) may be arranged to receive electromagnetic radiation (such as visible light) through an aperture that can be defined by the camera based on a number of well known techniques. For example, an optical sub-system, including one or more lenses and/or other optical elements, may define the aperture such that the received radiation is imaged by the optical sub-system and a resulting image is directed towards a sensor region such as a sensor array that includes a plurality of detectors defining a sensing surface. The sensor region may be configured to receive the image and to generate a set of image data based on the image. In some common applications, such as when using conventional digital cameras to capture images, the camera may be aligned to receive electromagnetic radiation associated with scenery having a given set of one or more objects. In these applications the set of image data is, for example, represented as digital image data using an electrical signal conveyed by electrical conductors or stored using memory or other digital storage techniques. In addition, the set of image data can be processed using a number of known image processing techniques.

In the context of the present disclosure, "zoom" may be understood as a capability to provide different magnifications of the same scene and/or object by changing the focal length of an optical system, with a higher "level of zoom" being associated herein with greater magnification and a lower level of zoom being associated with lower magnification. In typical film-based cameras, as well as in conventional digital cameras, optical zoom can be accomplished with multiple lens groups that are moved along an optical axis of an imaging system for defining a range of different lens configurations. For any given configuration, the position of the lens groups determines a focal length specific to that configuration. Based on well known techniques, camera users can adjustably control the positioning of the lens groups for selecting a specific level of zoom. At any specific level of zoom associated with a selected focal length of a camera's optical sub-assembly, an image represents a portion of a given scene based in part on the field of view defined by the lens system. For example, an image plane can be defined by the camera's sensor region (such as a sensor array), and the resulting image represents a field of view consistent with (i) a shape and transverse extent of the sensor region's sensing surface, and (ii) the selected focal length. For a given camera, there is a tradeoff between zoom and field of view such that camera settings exhibiting longer focal lengths generally tend to result in a greater level of zoom in conjunction with correspondingly narrower field of view. Conversely, camera settings exhibiting comparatively shorter focal lengths tend to result in a lower level of zoom in conjunction with a wider field of view.

Certain film-based cameras and digital cameras utilize a fixed focus imaging system, and these cameras generally do not feature adjustable optical zoom. Fixed focus imaging systems are especially common in PDAs. The high complexity, cost and decreased durability typically associated with moveable lenses (e.g., in cameras having optical zoom) limit their use in inexpensive camera modules such as mobile phone camera modules and other low cost modules. Film based cameras with fixed focus imaging systems generally offer no means for the user to adjust the degree of magnification while preparing to take a picture. On the other hand, digital cameras having fixed optical focus can incorporate digital zoom to allow the user to control the level of zoom before and/or after capturing the image by generating a corresponding set of image data. For example, digital zoom can utilize computer-processed cropping followed by signal upsampling and data interpolation of the cropped image to convert the cropped image to the original display size. As a result, however, the resolution of the cropped, final image is decreased and the image quality suffers.

SUMMARY

The following embodiments and aspects thereof are described and illustrated in conjunction with systems, tools and methods, which are meant to be exemplary and illustrative, not limiting in scope. In various embodiments, one or more problems and/or limitations associated with the above-described systems and methods have been addressed, while other embodiments are directed to other improvements.

In an embodiment, an imaging method utilizes a multi-aperture imaging system for producing a fused set of image data. This method may include providing a multi-aperture camera having first and second sub-cameras including a first sub-camera, having imaging optics defining a first aperture, with the first camera configured for imaging a first scene through the first aperture and for generating a first set of image data corresponding to the imaged first scene. A second camera may be provided, having imaging optics defining a second aperture, and the second sub-camera may be configured for imaging a second scene through the second aperture and for generating a second set of image data corresponding to the imaged second scene. The second sub-camera can be aligned such that the second scene at least partially overlaps the first scene in an overlap region that defines (i) a first collection of overlap image data as part of the first set of image data for the imaged first scene and (ii) an at least generally corresponding, second collection of overlap image data as part of the second set of image data for the imaged second scene. The second collection of overlap image data of the second scene may be represented as a plurality of image data subsets based on at least one associated characteristic of the second collection of overlap image data, such that each subset is superimposed across the overlap region. A fused set of image data can be produced from the first set of image data by changing the first collection of overlap image data in the overlap region of the first scene based on at least a selected one of, but less than all of the image data subsets.

In one aspect, representing the second collection of overlap image data may include configuring the plurality of image data subsets such that each subset is based on a different characteristic as compared to the characteristic associated with any one of the other subsets.

In another aspect, the first collection of overlap image data may include a first collection of luminance data, and the selected one of the image data subsets may be a luminance channel (of luminance data) based on luminance as the characteristic of the second collection of overlap image data, and changing of the first collection of overlap image data may include combining the first and second collections of luminance data. Arranging of the second sub-camera may include supplying the second sub-camera as a grayscale camera for providing the luminance channel as being composed of grayscale scaled image data.

In yet another aspect, representing the second collection of overlap image data may include filtering the second collection of overlap image data such that the selected image data subset is composed of filtered data, and filtering the second collection of overlap image data may include applying convolution filtering to the second collection of overlap image data such that the selected image data subset is influenced by the convolution filtering. Furthermore, representing the second collection of overlap image data may include scaling the second collection of overlap image data such that the selected image data subset is composed of scaled data.

In an additional aspect, the second collection of overlap image data may include intensity information, and scaling the second collection of overlap image data may include changing at least some of the intensity information. In this case scaling the second collection of overlap image data includes applying a gain for causing the changing of the intensity information.

In another aspect, representing the second collection of overlap image data may include transforming at least some of the second collection of overlap image data such that the characteristic of the second collection of overlap image data is represented in a transform domain, and the selected image data subset is composed of transformed data.

In a particular aspect, configuring the first sub-camera may include establishing a first focal length for the first sub-camera, and configuring the second camera may include establishing a second focal length for the second camera. The second focal length may be different than the first focal length such that the second camera exhibits a different field of view as compared to the first camera. Configuring the first camera may include providing a first sensing surface that has a first shape, with the first shape being characterized by a first transverse width. The first sensing surface may be oriented for receiving the imaged first scene to cause the generating of the first set of image data. In this particular aspect, configuring the second camera may include providing a second sensing surface that has a second shape that matches the first shape and has a transverse width that matches the first transverse width, and the second sensing surface may be oriented for receiving the imaged second scene to cause the generating of the first set of image data. Establishing the first focal length may cause the first set of image data to exhibit a first level of zoom with respect to the first scene, and establishing the second focal length may cause the second set of data to exhibit a second level of zoom with respect to the second scene, and the first level of zoom may be greater than the first level of zoom. In some instances, imaging of the first scene may causes the first set of image data to have a first angular frequency based at least in part on the first focal length, and the imaging of the second scene may cause the second collection of overlap data to have a second angular frequency based at least in part on the second focal length, such that the second angular frequency is higher than the first angular frequency. In this particular aspect, generating the first set of image data may include initially producing an initial set of image data and then producing the first set of image data from the initial set of image data by upsampling the initial set of image data for increasing the angular frequency of the first set of image data, as compared to the initial image data, to a target angular frequency such that the first set of image data is upsampled image data. The initial set of image data may include a group of initial data points, and the upsampling may cause the first set of image data to include (i) the group of initial data points and (ii) an additional number of data points. The upsampling of the initial set of image data may further include interpolating between the initial data points for assigning values for each of the additional of data points. Furthermore, the upsampling can include matching the increased angular frequency to the second angular frequency such that the target angular frequency of the first set of image data is at least approximately equal to the second angular frequency.

In one embodiment, the first sub-camera may be configured with a first sensor region having a first sensing surface, and the first sensor region may be aligned such that the imaging of the first scene includes projecting an image of the first scene through the first aperture and onto the first sensing surface such that the first sensor region causes the generating of the first set of image data. In this example, the second sub-camera may be furnished with a second sensor region having a second sensing surface, and the second sensor region may be aligned such that the imaging of the second scene includes projecting an image of the second scene through the second aperture and onto the second sensing surface such that the second sensor region causes the generating of the second set of image data. In one aspect of this embodiment, the first sensing surface may have a first shape defined by a first surface area and the second sensing surface may have a second shape that at least generally matches the first shape, and the second surface may have a second surface area that is at least approximately equal to the first surface area. It is noted that the first sensor region and the second sensor region may each be a part of a single image sensor.

In another aspect of this embodiment, the first collection of overlap image data may initially be represented based on first, second and third data channels, and changing the first collection of overlap image data may include converting the first collection of overlap image data, as represented by the first second and third data channels, to represent the first collection of overlap image data based on a different set of three data channels. For example, the first, second, and third channels may be R, G and B channels, respectively, and the different set of data channels may be Y, U and V channels.

In yet another aspect of this embodiment, the second collection of overlap image data may be initially based on first, second, and third channels, and representing the fused set of overlap image data may further include converting the second collection of overlap image data (as represented by the first, second, and third channels) to represent the second collection of overlap data based on a different set of three channels. Each of the different channels may serve as one of the plurality of image data subsets. For example, the three data channels may be R, G, and B channels, and the different set of data channels may be Y, U and V channels, and the Y channel may serve as the selected subset of overlap image data.

In an aspect, generating the first set of image data may include initially producing a set of initial image data and then producing the first set of image data from the initial image data by applying a first forward transformation to at least a portion of the initial image data such that the first set of image data may be transformed data in a transform domain such that the first set of image data least generally represents, in the transform domain, at least some of the portion of the initial image data, and representing the second collection of overlap image data may include applying a second forward transformation to at least some of the second set of image data such that the characteristic of the second collection of image data is represented in the transform domain, and at least the selected image data subset is composed of transformed data. Changing the first collection of overlap image data may include merging the selected one of the image data subsets with the first collection of overlap image data in the transform domain to generate a merged data set in the transform domain, and producing the fused set of image data may include converting the merged data set from the transform domain by applying thereto at least one of (i) a reverse transformation and (ii) an inverse transformation.

In an additional aspect, producing the fused set of image data further may include identifying at least one spatial feature that is present at a feature position within the first collection of overlap image data of the first set of image data, searching for a related representation of at least one identified spatial feature (in the selected image data subset) such that each related representation at least approximately corresponds to one of the identified features, and (for at least a selected one of the related representations that is located in the selected image data subset based on the searching) registering the selected related representation as being associated with the feature position of the corresponding identified feature. In this additional aspect, changing the first collection of overlap image data may include modifying each identified spatial feature based on the corresponding related representation of that feature. It is noted that the related representation may have a related feature position within the selected image data subset, and searching for the related representation can include finding a spatial shift between the related feature position and the feature position. It is further noted that finding the spatial shift may include determining that the spatial shift is non-zero and is caused by parallax between the first and second sub-cameras.

The additional aspect may include (i) defining a reference block overlying the feature position and having a shape that overlies a reference portion of the first collection of overlap image data such that the reference portion of image data at least represents the spatial feature, (ii) defining a search region within the selected image data subset, and (iii) designating a plurality of candidate blocks within the search region, each of which candidate blocks overlies an associated portion of the selected image data subset at a candidate position therein. In some instances the searching may include determining a degree of correspondence between (i) the reference portion of data overlaid by the reference block and (ii) the portion of data associated with each of the plurality of candidate blocks, and in this instance one candidate block may be selected based on the degree of correspondence, such that the selected candidate block exhibits the highest degree of correspondence as compared to the other candidate blocks. Registering the selected related representation may include associating the candidate position of the selected candidate block with the feature position, and modifying of the spatial feature may include changing the reference portion of data based on at least some of the portion of data associated with the selected candidate block. Designating the plurality of candidate blocks may include defining a first candidate block as a specific one of the plurality of candidate blocks, and a second candidate block as a different one of the plurality of candidate blocks, such that the first and second candidate blocks partially overlap one another.

In addition to the exemplary aspects and embodiments described above, further aspects and embodiments will become apparent by reference to the drawings and by study of the following descriptions. In addition to the exemplary aspects and embodiments described above, further aspects and embodiments will become apparent by reference to the drawings and by study of the following descriptions.

BRIEF DESCRIPTION OF THE DRAWINGS

Exemplary embodiments are illustrated in referenced figures of the drawings. It is intended that the embodiments and figures disclosed herein are to be illustrative rather than limiting.

DETAILED DESCRIPTION OF THE DRAWINGS

Figure 1:
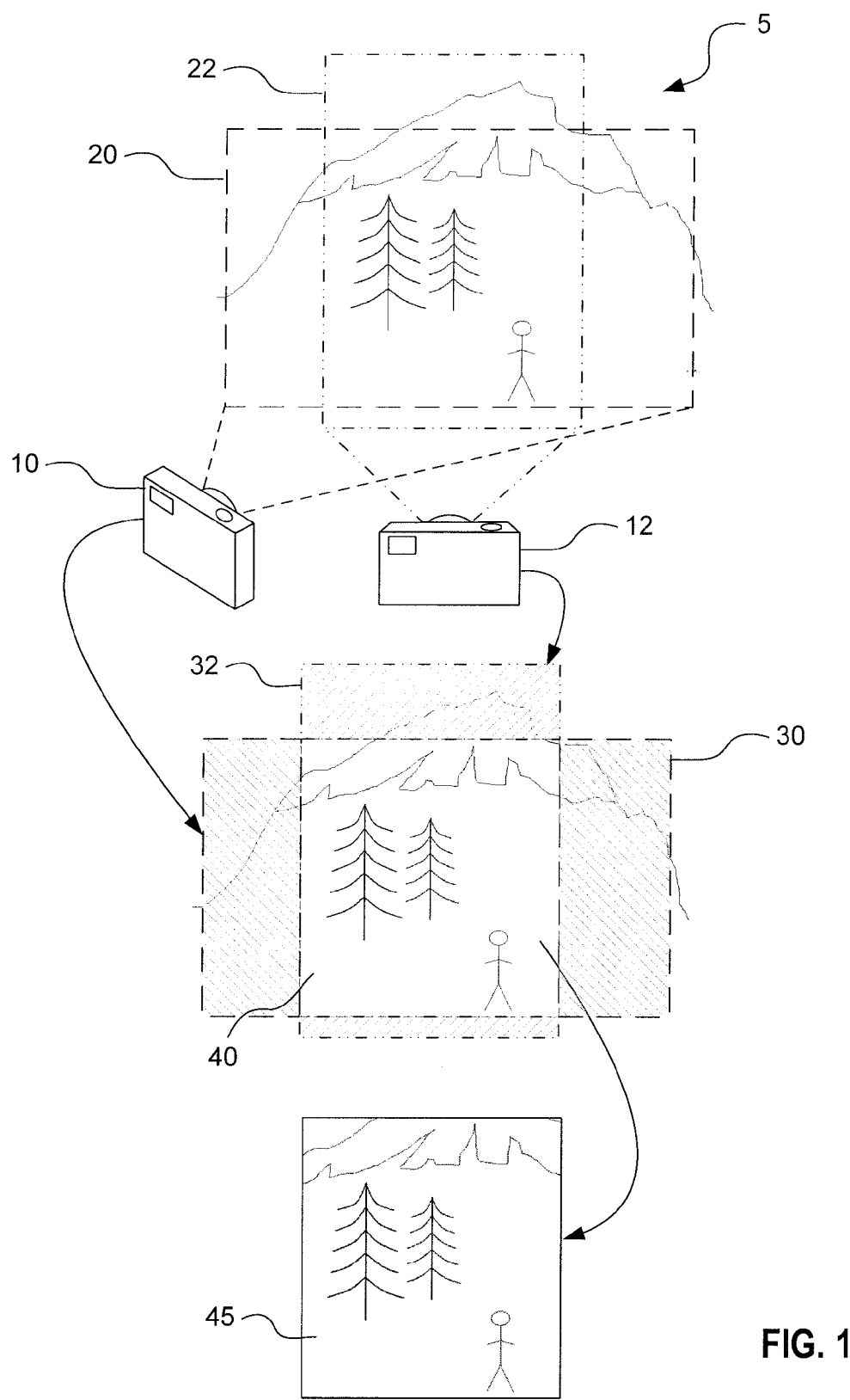
FIG. 1 is a schematic view illustrating fusion of image data from two sources.

The following description is presented to enable one of ordinary skill in the art to make and use the embodiments herein, and is provided in the context of a patent application and its requirements. Various modifications to the described embodiments will be readily apparent to those skilled in the art and the principles herein may be applied to other embodiments. Thus, the present disclosure is not intended to be limited to the embodiments shown but is to be accorded the widest scope consistent with the principles and features described herein.

Certain embodiments described in this disclosure address issues that affect currently available systems by providing multi-aperture camera systems with the imaging characteristics approaching those of optical zoom and a size profile similar to fixed focus systems. In addition to combinations of optical and electronic components, this disclosure provides methods for fusing images having different optical characteristics.

The use of multi-aperture digital camera systems provides advantages over certain optical zoom systems (e.g., smaller module height, lower cost, elimination of moving parts) and over strictly digital zoom systems (e.g., better image quality, as quantified by, for example, image resolution).

A first digital camera, for example, operated by a first photographer, exhibits a specific fixed focal length, and the focal length influences an overall field of view that is consistent with a given level of zoom of the first digital camera. For example, the first digital camera is hand-held by the first photographer and hand-aligned in a direction suitable for imaging a set of objects that is centered on a tree (as a first object) and includes a person (as a second object) sitting at a picnic table (as a third object) The field of view of the first digital camera can be of sufficient transverse extent such that the imaged scene includes all three objects, each in their entirety, in a way that is consistent at least with (i) the directional orientation of the camera, (ii) a given spacing from the camera to the tree, and (iii) the level of zoom of the camera. The first photographer can select a fixed focal length camera having a sufficiently "wide" angle lens (i.e., corresponding to a low degree of zoom) such that all three objects can be simultaneously imaged. Alternatively, the first photographer can intentionally place herself at a selected distance from the objects in order to achieve the desired result of having all three objects within the field of view of the camera. As described immediately above, the level of zoom of the camera is determined in part by the focal length of the camera, with the resulting field of view being determined by other factors such as a physical size of a sensor array (such as a charge-coupled device, or "CCD" array) utilized by and associated with the camera. In this example, the first digital camera produces a first set of image data corresponding to the imaged scene.

Continuing with the above example, a second photographer can stand next to the first photographer, and hold a fixed focal length compact digital camera that is aligned in approximately the same direction as the first photographer's camera. The second photographer in this example might be particularly interested in the tree, and may therefore elect to utilize a digital zoom feature to digitally adjust the level of zoom such that only the tree (the first object in the scene) is captured, while the rest of the scene is cropped. In this example, the compact digital camera produces a second set of image data corresponding to the tree. While the second set of image data (captured by the second photographer) corresponds to the same tree that is imaged in a corresponding portion of the first set of image data, and therefore can be considered as representing a part of the same scene imaged by the first set of image data, for purposes of this disclosure, the second set of image data is regarded as representing a second scene that overlaps the first scene.

Throughout this disclosure, the terms "image" and "digital signal" are used interchangeably when referring to signal processing. For example, those skilled in the art will recognize that the term "image processing" is often used interchangeably with "digital signal processing" or, more simply, "signal processing".

Turning now to the figures, wherein like reference numbers are used hereinafter to refer to like components whenever possible throughout the various figures, FIG. 1 is a schematic view illustrating fusion of image data from two sources. A scene 5 is imaged by two cameras 10 and 12 that image fields of view 20 and 22, respectively, producing first and second sets of image data 30 and 32, respectively. In embodiments herein, cameras 10 and 12 may be physically separate devices, as shown in FIG. 1, or may be sub-cameras of a single multi-aperture camera, as discussed below in connection with FIGS. 2A and 2B. First and second sets of image data 30 and 32 overlap in an overlap region 40. In an embodiment, data from first and second sets of image data 30 and 32 are utilized to generate a fused set of image data 45. Fused set of imaged data 45 may span overlap region 40, as shown in FIG. 1, or may extend beyond overlap region 40 to the extent of either first and second sets of image data 30 and 32, as will be discussed below.

Figure 2A:
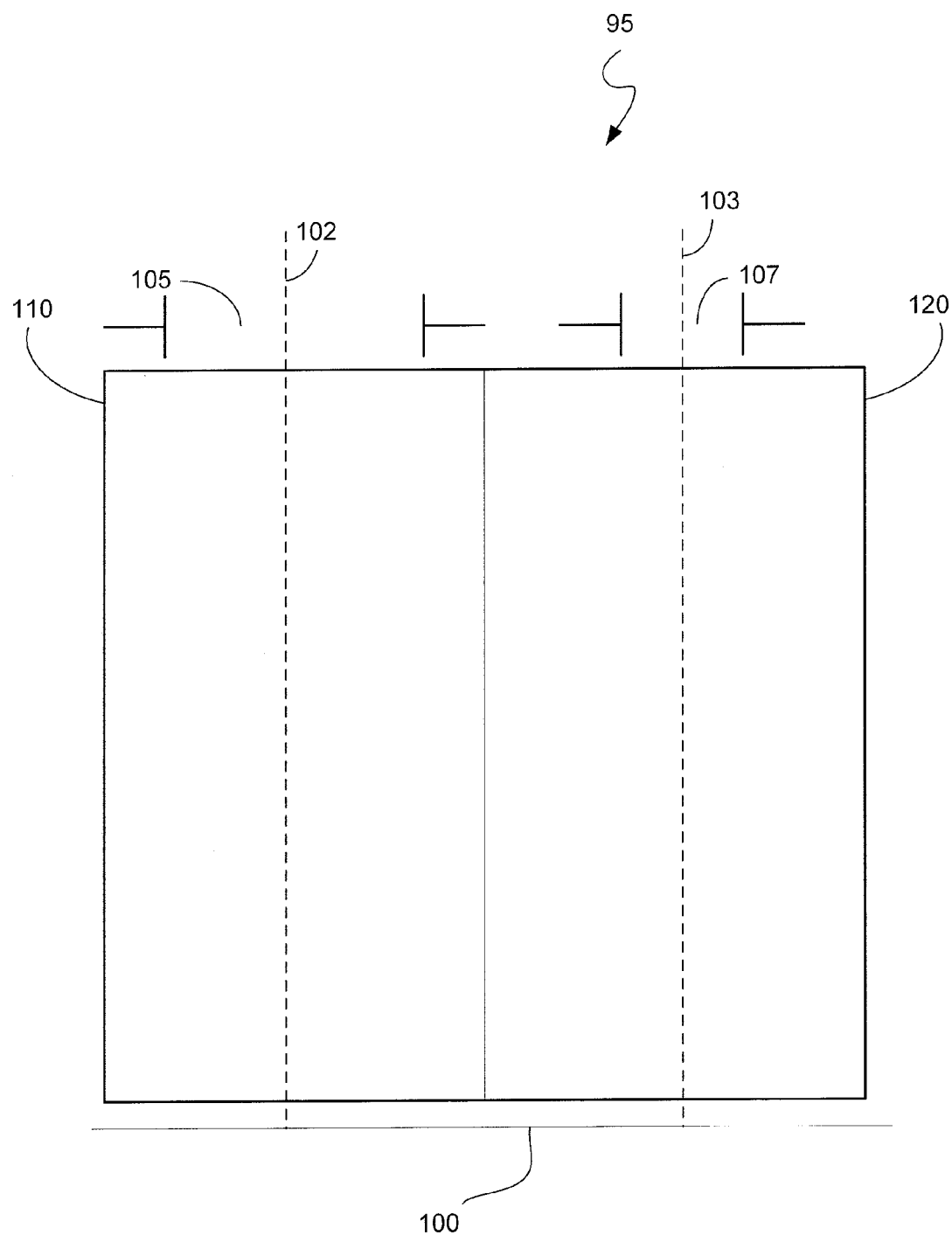
FIG. 2A is a diagrammatic view of one embodiment of an optical design for a multi-aperture camera.

FIG. 2A illustrates a simplified diagrammatic representation of an exemplary multi-aperture zoom camera 95 that includes two sub-cameras. Each sub-camera includes an optical sub-system (represented by boxes 110 and 120 in FIG. 2A) in optical communication with a detector, or sensor region, 100 or a portion of image sensor region 100 along a respective optical axis (102, 103). The optical sub-systems may include one or more optical elements such as lenses, but also may include spacers and elements without optical power.

In the embodiment of a multi-aperture camera illustrated in FIG. 2A, each of optical sub-systems 110 and 120 may have a different focal length, but the same f-number, and each optical sub-system may image a scene and project an image onto a portion (such as approximately one half) of sensor region 100 for generating a corresponding set of image data corresponding to each scene. Sensor region 100 in this exemplary embodiment may be provided, for instance, as a complementary metal oxide semiconductor ("CMOS") sensor, a CCD array or any other analog or digital array of sensors or sensor media capable of receiving image information from two or more optical sub-systems. While sensor region 100 is illustrated in FIG. 2A as one continuous part or component, there is no requirement for this to be the case, as will be described below. In the exemplified illustration in FIG. 2, each optical sub-system may have a different focal length resulting in different fields of view; there is a "wide" sub-camera 120 having aperture 107 and a "tele" or "zoom" sub-camera 110 having aperture 105.

In the embodiment of FIG. 2A, it is convenient for illustrative purposes to consider an image sensor that is a two-dimensional array of individual sensing pixels, with a total of about 3 megapixels in the entire array. In a two-aperture system such as the one shown in FIG. 2, each half of the image sensor used by each of the optical sub-systems might include about 1.5 megapixels. It is contemplated that sensors of sub-cameras of a single multi-aperture camera may be shared in any manner; that is, pixels thereof may be (1) in separate sensor chips with images focused thereon by a single optical system or by separate optical subsystems, (2) blocks of pixels adjacent one another in a single sensor chip, or (3) interleaved in any manner within a single sensor chip. Similarly, sensors (and/or pixels thereof) of separate cameras that provide image data for embodiments herein are not limited to having identical shapes or sizes.

Figure 2B:
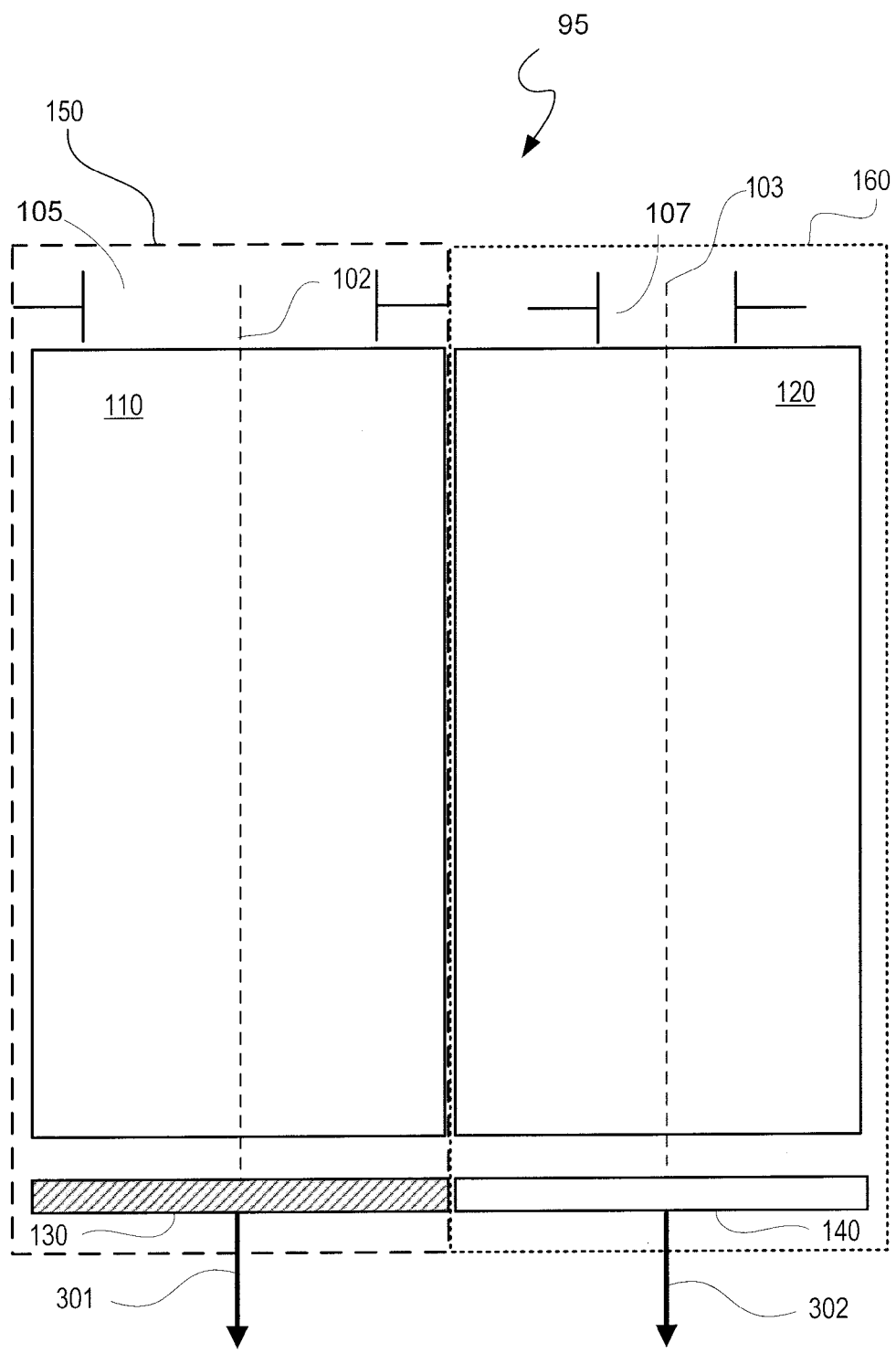
FIG. 2B is a diagrammatic view of another embodiment of an optical design for a multi-aperture camera.

Attention is now turned to FIG. 2B with continuing reference to FIG. 2A. FIG. 2B illustrates another embodiment of multi-aperture camera 95, having a sensor region configured as two separate sensors 130 and 140 respectively. In FIG. 2B first sub-camera 150 is indicated with a coarse dashed line and second sub-camera 160 is indicated with a fine dashed line. First sub-camera 150 includes optical sub-system 110 configured to image a first scene through first aperture 105 and first sensor 130 may receive the resulting image for generating therefrom a first set of image data (represented by an arrow 301) corresponding to the imaged first scene. Second sub-camera 160 includes second optical sub-system 120 configured to image a second scene through second aperture 107 and second sensor 140 may receive the resulting second image for generating therefrom a second set of image data (represented by an arrow 302) corresponding to the imaged second scene. First and second sub-cameras 150 and 160 are therefore disclosed as a way to generate image data from two sub-cameras. Certain embodiments herein may require that one or the other of sub-cameras 150 and 160 have certain relative focal lengths (e.g., tele or wide) or imaging capabilities (e.g., grayscale or color image data); it is not intended that such requirements remain fixed to one sub-camera or the other throughout the present disclosure. Also, it is recognized herein that the first and second optical sub-systems each may include one or more optical elements such as, but not limited to, refractive elements, diffractive elements, apertures, phase modifying elements and spacers, and that the first and second optical sub-systems may be identical to each other, may have different optical or physical characteristics, and may or may not be physically adjacent to one another as shown in FIGS. 2A and 2B.

Aperture 105 and optical sub-system 110 may be configured, for example, such that first sub-camera 150 has a wider field of view as compared to second sub-camera 160. In other words, first sub-camera 150 serves as a wide sub-camera having a field of view that is wider as compared to that of second sub-camera 160. Furthermore, second sub-camera 160 may serve as a "tele" sub-camera having a higher level of zoom as compared to first sub-camera 150.

As described above, the first and second sub-cameras in the present example may be oriented in a direction that is approximately the same for both the first and second cameras, as indicated by optical axes 102 and 103, respectively. As a result, the first and second scenes may overlap one another such that overlapping portions of the two scenes may simultaneously represent a similar image, albeit from two slightly different views. This causes the first and second image data sets to include subsets of data that are to be considered as overlapping one another, as will be discussed in greater detail below.

Figure 3:
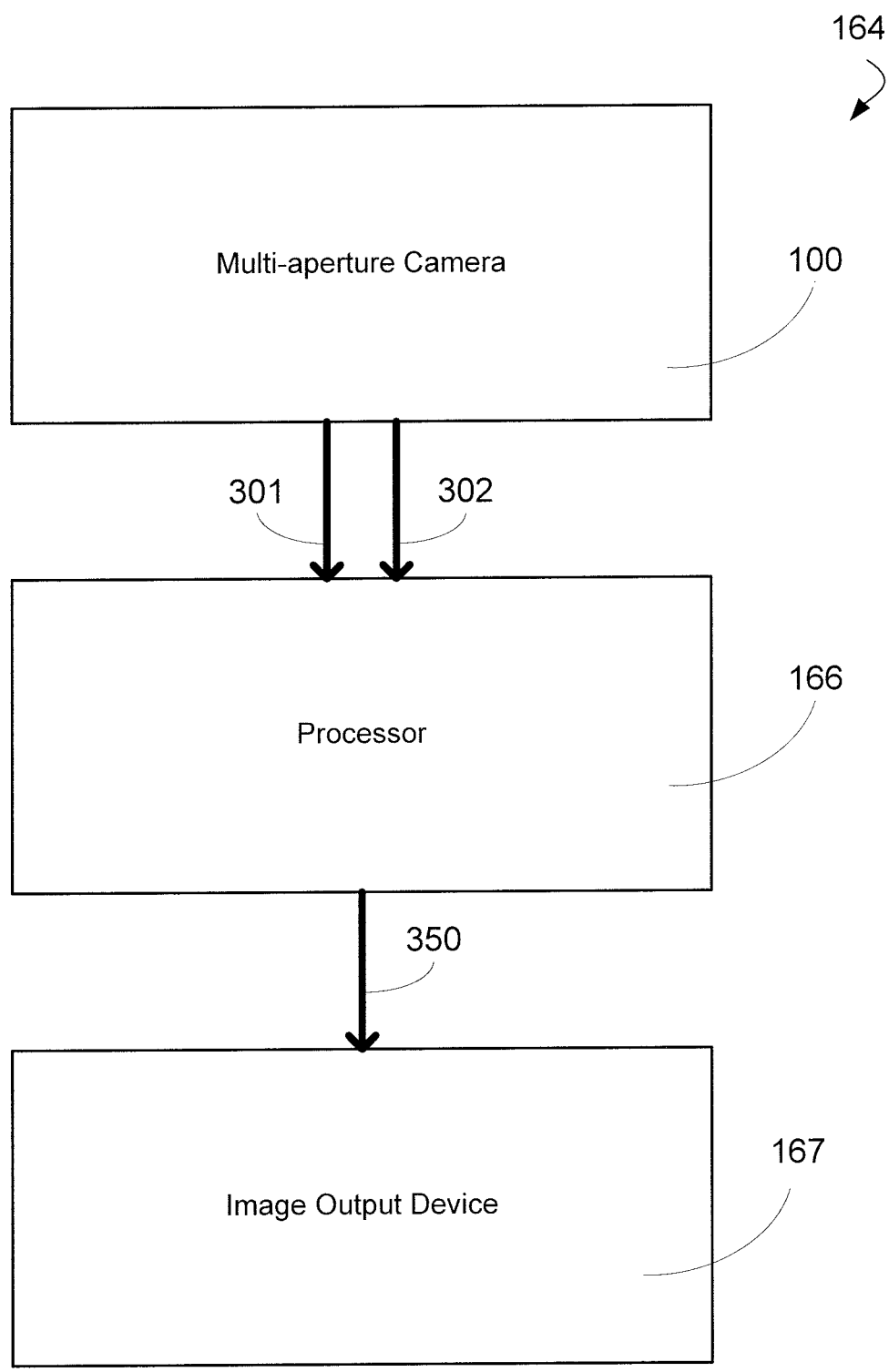
FIG. 3 is a block diagram illustrating a multi-aperture imaging system.

Attention is now turned to FIG. 3 with ongoing reference to FIG. 2B. FIG. 3 illustrates an embodiment of a multi-aperture imaging system 164. Multi aperture camera 100 provides first and second sets of image data 301 and 302 to a processor 166 which may, for example, be configured for combining or "fusing" the image data sets as will be described hereinafter, and fused image data 350 may then be provided to an image output device 167. It is noted that one or both of processor 166 and output device 167 may be arranged integrally with the multi-aperture camera, in a manner that is analogous to conventional digital cameras having integral processors and displays. In another example, one or both of processor 166 and output device 167 may be arranged externally to the given multi-aperture camera. In either arrangement, processor 167 is configured for receiving image data from multi-aperture camera 100, and image output device 167 is configured for receiving processed image data from processor 166. As described above, and based on well known techniques, image data may be represented and/or conveyed using one or both of (i) electrical signals (wirelessly or by electrical conductors) and (ii) memory or other digital storage techniques.

Figure 4:
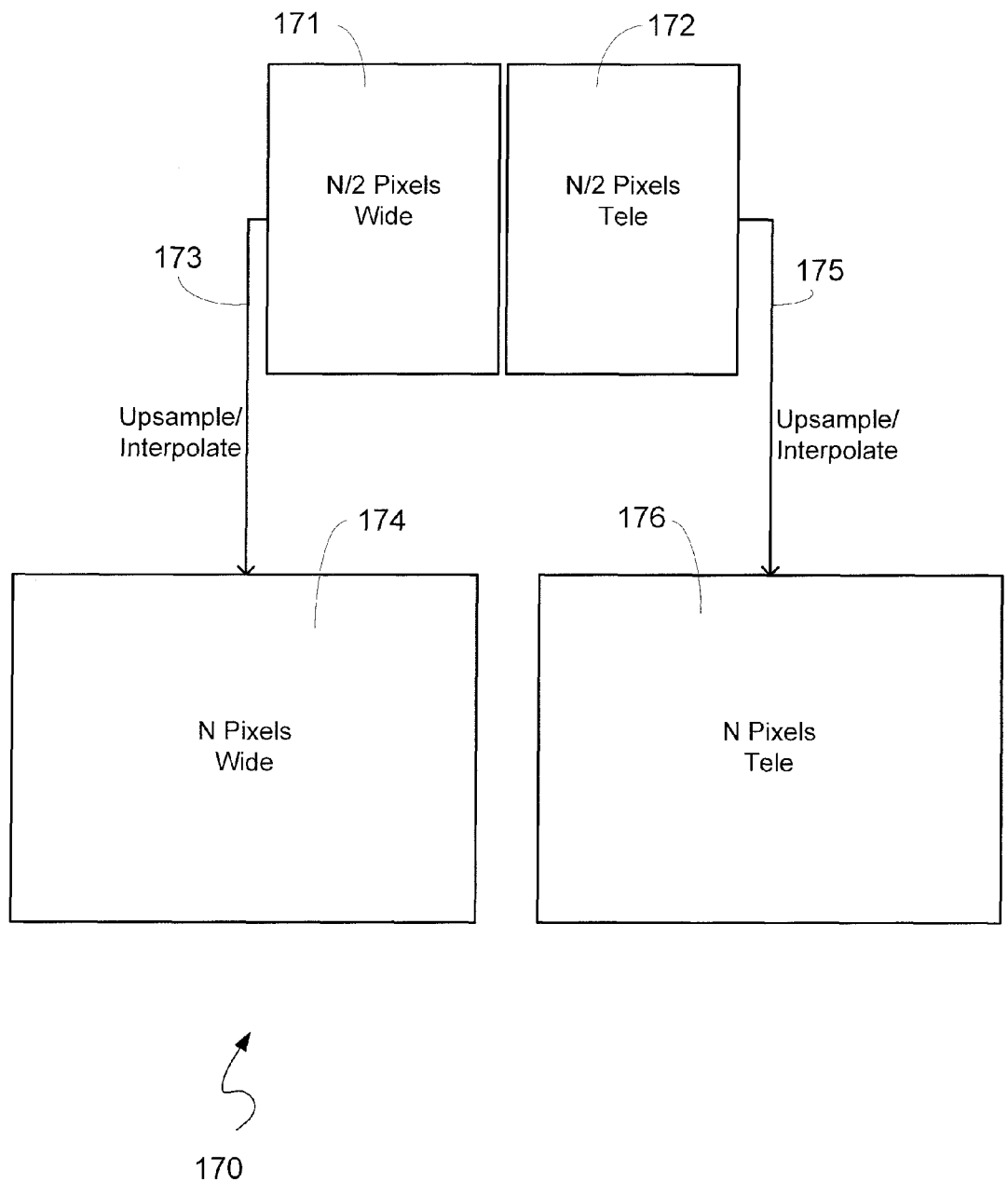
FIG. 4 is a block diagram illustrating one embodiment of a process for creating full-size images from a multi-aperture camera that shares a single sensor.

FIG. 4 schematically illustrates operation of a system 170 for processing first and second sets of image data generated by first and second sub-cameras of a multi-aperture camera (e.g., sub-cameras 150 and 160 of FIG. 2A and FIG. 2B). First and second sensor regions 171 and 172 respectively, associated with first and second sub-cameras 150 and 160 respectively, each have N/2 pixels such that the multi-aperture camera has a total of N pixels. In some instances, a user of the multi-aperture camera may desire that a final image size have a total of N pixels. For example, a multi-aperture camera may include first and second sensor regions, associated with the first and second sub-cameras, that each have 1.5 megapixels, such that the overall sensor region of the multi-aperture camera is 3 megapixels. In another example, a user of the multi-aperture camera may desire that a final image size (tele or wide) correspond to the original 3 megapixel sensor size. FIG. 4 represents one way to accomplish this by applying 2-dimensional upsampling and interpolation to the first and second sets of image data (for example digital signals) associated with the first and second sub-cameras. Upsampling is a process of increasing the sampling frequency of a digital signal and creates new data points in the signal. Interpolation calculates the values for the created data points. A first set of image data 173, having N/2 pixels, is upsampled and interpolated to provide a first upsampled and interpolated set 174, and a second set of image data 175 having N/2 pixels, is upsampled and interpolated to provide a second upsampled and interpolated set 176. Importantly, the newly created data points did not exist in the original digital signal and as a consequence, upsampling and interpolation generally results in some level of degradation in image quality. Methods of upsampling and interpolation include, but are not limited to, linear interpolation, polynomial interpolation, spline interpolation, bilinear interpolation, bicubic interpolation, and wavelet interpolation. In cases where a higher level of image quality is desired by the multi-aperture camera user, it is possible to combine, or fuse, the data contained in two or more of the images recorded in the multi-aperture camera to create a single, foveated high resolution image. These fused images will have regions of higher resolution and may be combined with other upsampling and interpolation techniques to create a high quality image.

Figure 5:
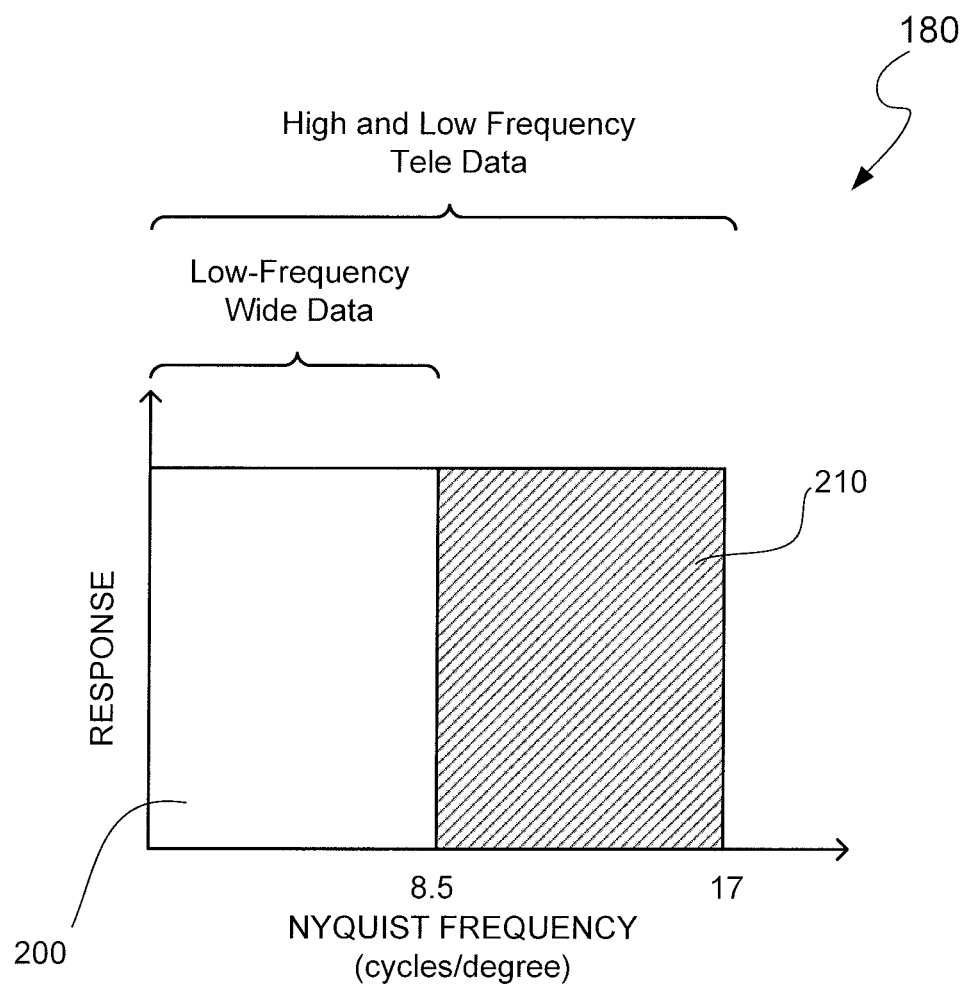
FIG. 5 is an exemplary plot illustrating the differences in angular frequency information contained in the images produced from optical sub-systems having different focal lengths, but the same f-number.

FIG. 5 shows a plot 180 that illustrates differences in angular frequency information present in images having different fields of views, but identical image sensor sizes. For simplicity, the plot applies with respect to image data values lying along one-dimension only of a given image sensor and/or sensing region. Those skilled in the art will recognize that this discussion may be adapted to apply to the two-dimensional sensor systems described herein.

Well known principles of sampling theory dictate that for a detector with 'n' pixels, the sampling frequency (fs) of the detector is $$fs = n/FOV,$$

where FOV is the field of view, in degrees. This yields a Nyquist sampling frequency of:

$$Nyquist = fs/2$$

in cycles/degree. Optical systems generally cannot distinguish frequencies above the Nyquist limit. As depicted in FIGS. 2A and 2B, the wide and tele optical sub-systems may be configured such that the image captured by the tele system corresponds to, or overlaps with, some portion of the image captured by the wide optical sub-system. This will be referred to as the "overlap region". For the multi-aperture cameras illustrated in FIGS. 2A and 2B, the "wide" optical sub-system may have, for example, a field of view of 60 degrees. As an example, given a 1024 pixel sampling (in one dimension), the "wide" Nyquist frequency is 8.5 cycles/degree. The "tele" optical sub-system in FIGS. 2A and 2B uses the same number of pixels as the wide optical sub-system, but has a field of view, for example, of 30 degrees, yielding a "tele" Nyquist frequency of 17 cycles/degree. In the embodiments in FIGS. 2A and 1B, the tele optical sub-system may create an image with a field of view that substantially overlaps the central portion of the wide image, defining an overlap region over which the second scene (imaged by the second sub-camera) substantially overlaps the first scene (imaged by the first sub-camera). With regard to this overlap region, a corresponding collection of the first set of image data is considered as a first collection of overlap image data, and a corresponding collection of the second set of image data is to be considered herein as a second collection of overlap image data. In other words, the first collection of overlap image data (from the first sub-camera) overlaps the second collection of overlap image data (from the second sub-camera). In a particular example depicted graphically by FIG. 5 the wide signal only includes frequency data below 8.5 cycles/degree (a region 200 in FIG. 4) and the tele image contains frequency data from 0 to 17 cycles/degree for the overlap region. That is, the tele image contains high frequency data that was not captured by the wide sub-camera (e.g., between 8.5 and 17 cycles/degree). A shaded region 210 represents the high frequency data captured by the tele optical sub-system.

Figure 6:
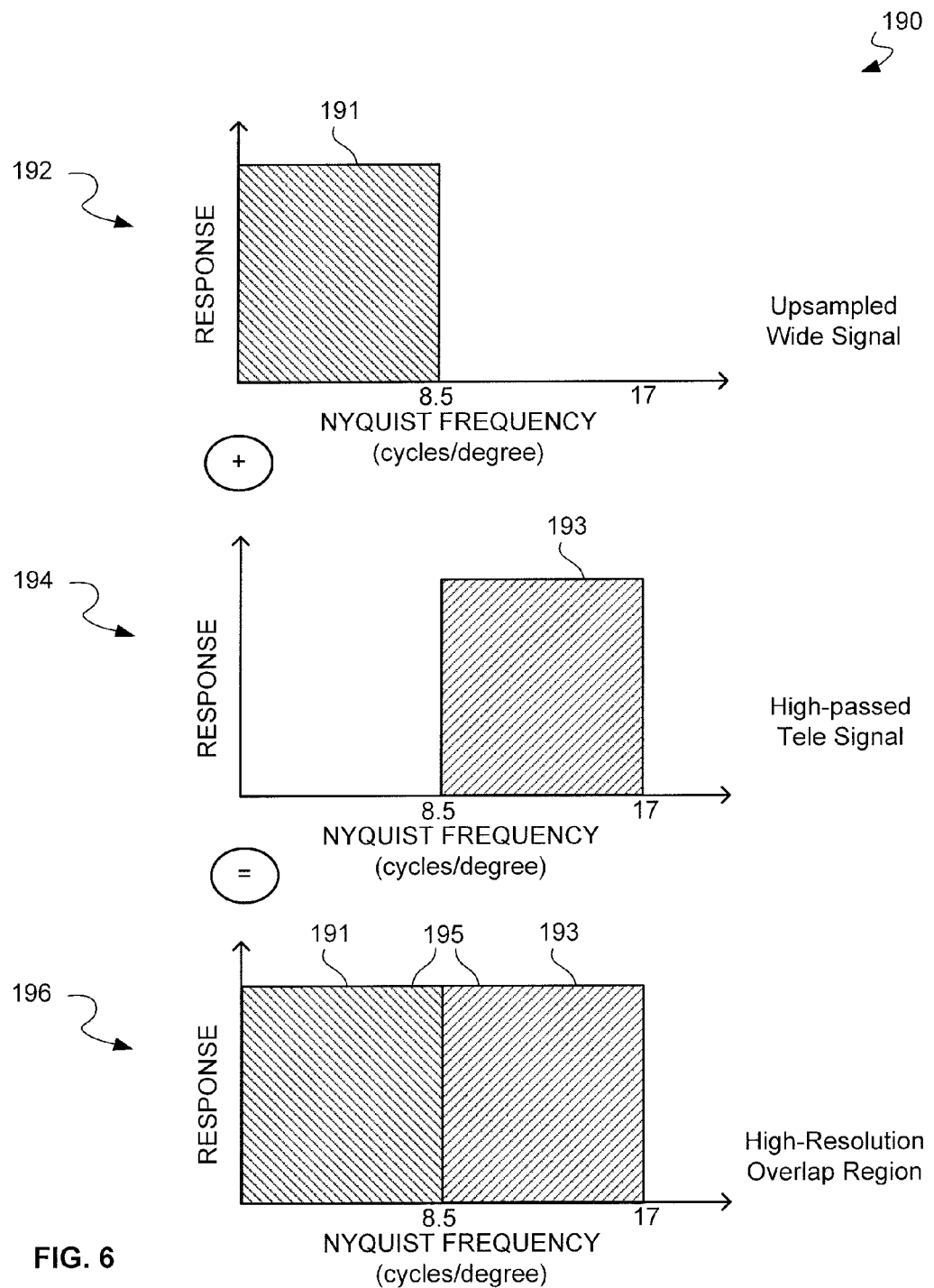
FIG. 6 is a series of exemplary plots, shown here to illustrate how differences in angular frequency information from images produced from sub-cameras having different focal lengths can be exploited in fusing the images.

FIG. 6 shows a series of three plots 192, 194 and 196, vertically aligned with one another and generally indicated by reference number 190, that illustrate certain principles underlying one embodiment of a method of image fusion. As illustrated in FIG. 6, a first set of image data (for example a digital signal) generated by a wide optical sub-system (e.g., a "wide image") may be upsampled (for example as described with reference to FIG. 4) to match an angular sampling frequency of a tele digital signal obtained from a tele optical sub-system (e.g., a "tele image") such that each of the images has the same, or nearly the same, effective Nyquist frequency. The upsampled first set of image data 191 is represented in first plot 192, and the second set of image data 193 is represented in second plot 194. It is noted that second set of image data 193 has been high-pass filtered, as will be described in greater detail below. Upsampling the first set of image data to create first set of image data 191 effectively doubles a number of points in the wide image without changing its field of view, but it also leaves a "gap" in the frequency domain between a detected Nyquist frequency and an upsampled Nyquist frequency of the image data (in this example, from 8.5 to 17 cycles per degree). This gap can be filled by calculated data (e.g., interpolation, as previously described with reference to FIG. 3), but if the region of overlap between the fields of view of the tele and wide images is known, or can be determined by image registration techniques, high-frequency information captured by the tele image may be added back into the upsampled wide image at that overlap region. In other words, the high frequency tele data may be used to fill the 'gap' created by upsampling the wide image, at the overlap region. This results in a fused, foveated image of high resolution, represented in FIG. 6 by fused data set 195, shown in third plot 196 that includes both first set of image data 191 and second set of image data 193. In the event that the upsampling of the first set of image data results in an angular frequency that does not exactly match the angular frequency of the tele signal, additional blending steps may be utilized as part of, or in addition to, the fusion of tele image data with wide image data, to improve image quality of fused data set 195.

Figure 7:
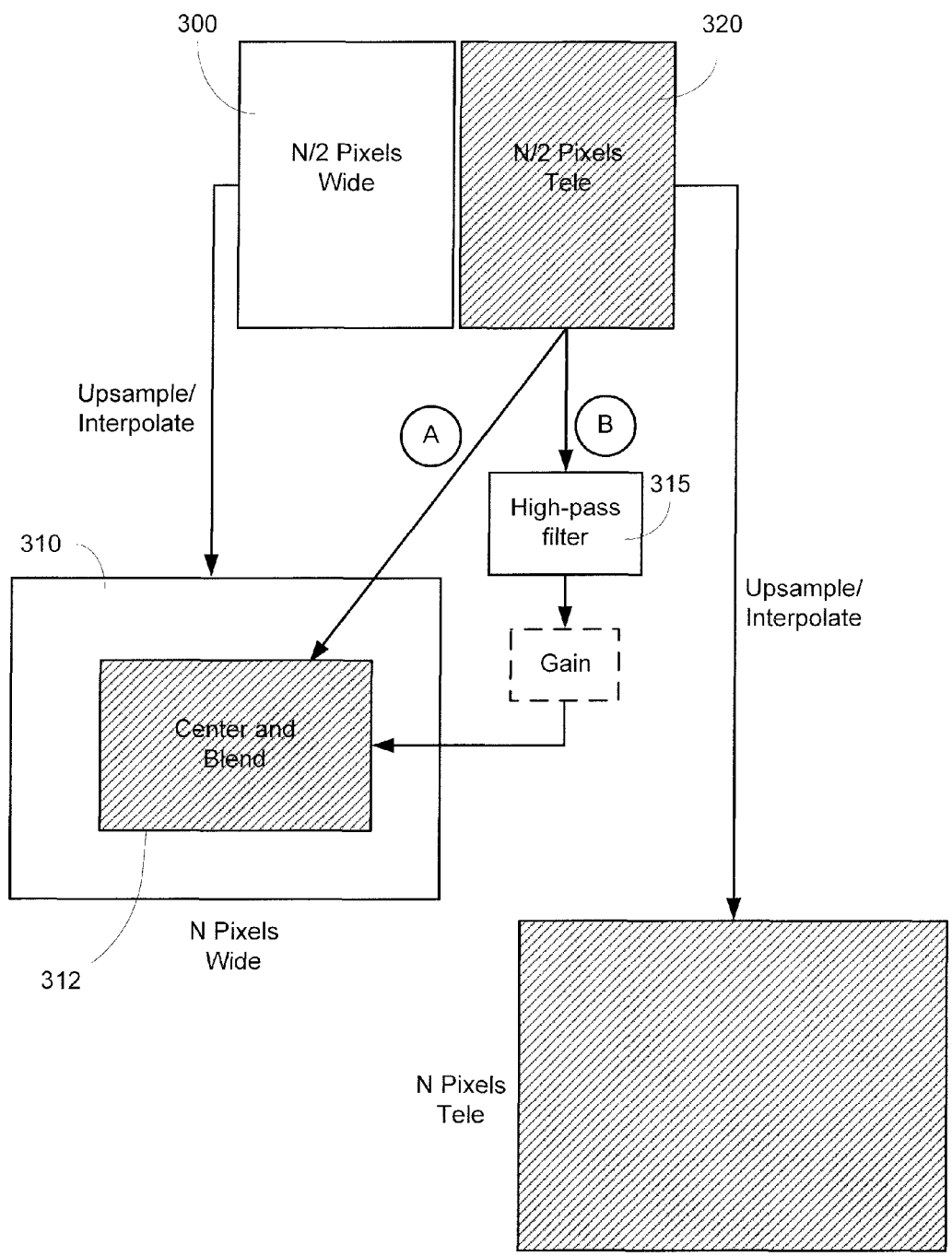
FIG. 7 is a combination block diagram and flow chart illustrating optional embodiments of the methods for processing and fusing images from a multi-aperture camera.

FIG. 7 illustrates details of one embodiment of the process of FIG. 6. In FIG. 7, a first set of image data 300 (e.g., a wide image) is upsampled and interpolated to form a target image 310. A second set of image data 320 (e.g., a tele image) is centered and blended into target image 310. As described previously with reference to FIGS. 2A and 2B, the first and second sub-cameras in the present example may be oriented in a direction that is approximately the same for both the first and second cameras, as indicated by axes 102 and 103, respectively. As a result, the first and second scenes, imaged by the first and second cameras and represented by the first and second sets of image data, may overlap with one another such that overlapping portions of the two scenes may simultaneously represent a similar physical source of scenery, albeit from two slightly different views. As described previously, this may cause the first and second image data sets to include collections of data that are to be considered as overlapping one another, as will be discussed in greater detail immediately hereinafter.

FIG. 7 illustrates a particular example wherein a multi-aperture camera is configured such that the second sub-camera (e.g., sub-camera 160, FIG. 2A) having a higher level of zoom as compared to the first sub-camera) is aligned with the first sub-camera (e.g., sub-camera 150) in an orientation that causes the second scene (imaged by the second camera) to be at least approximately centered within the first scene (imaged by the first camera). One result of this arrangement is that a second set of image data overlaps a first collection of overlap data that is centered within the first set of image data. In this particular arrangement, as depicted in FIG. 7, the second set of image data is entirely overlapped by the first set of image data, and the entire second set of image data serves as the second set of overlap image data.

In one embodiment (Option A—indicated in FIG. 7 by a circled letter "A"), a blend procedure may include changing a first set of overlap image data by directly replacing data from an upsampled wide image with low and high frequency data from a tele image. Alternatively, the low frequency data from the tele and wide images may be averaged as part of the center and blend step, and the high frequency data (obtained after interpolation of the wide image) is replaced with data from the tele image. In another embodiment, indicated by Option B (indicated in FIG. 7 by a circled letter "B"), a high-pass filter 315 is optionally applied to the signal from the tele image prior to the steps of centering and blending, to remove low frequency data. High-pass filters, suitable for use as high-pass filter 315 in the process illustrated in FIG. 6, may include convolution filters such as finite impulse response (FIR) filters and infinite impulse response (IIR) filters, among others. Removing low frequency data already present in an overlap region 312 of the wide image, from the tele image, allows faster, less computationally intense fusion of the two images.

As mentioned previously, a tele image may not correspond to the exact image center of a wide image, or that the tele image may only partially overlap with the wide image. For example, mechanical alignment between axes of a first camera and a second camera (e.g., axes 102 and 103, FIG. 2B) may be of limited precision, and the mechanical alignment may result in a spatial shift between the first and second scenes such that the second scene is not perfectly centered within the first scene. Therefore, it may be necessary to compensate for the spatial shift using signal processing techniques to register the two images prior to fusion. Image registration techniques, to be described in detail at appropriate points hereinafter include, but are not limited to: identification and alignment of center pixels for the two images to be registered; mapping features (e.g., lines, curves, boundaries, points, line intersections, and others) in one image to features in a second image; image similarity methods; search-based methods; spatial-domain methods (using control points); and frequency domain methods (e.g., phase correlation).

In certain of the image fusion processes presented herein, a resulting image is either a full-size wide image or a full-size tele image, produced using upsampling/interpolation of the original tele image. The term "full-size," in the case where sub-cameras in a multi-aperture camera share a single sensor, means that a resulting image size corresponds to an image that would be produced using substantially all of the pixels available on the sensor, were it not shared. This does not preclude a user from choosing an intermediate level of zoom between wide and tele fields of view. Further cropping and re-sampling of target image 310, for example, allows the user to choose any level of zoom and to utilize the multi-aperture camera as a continuous zoom camera.

Figure 8:
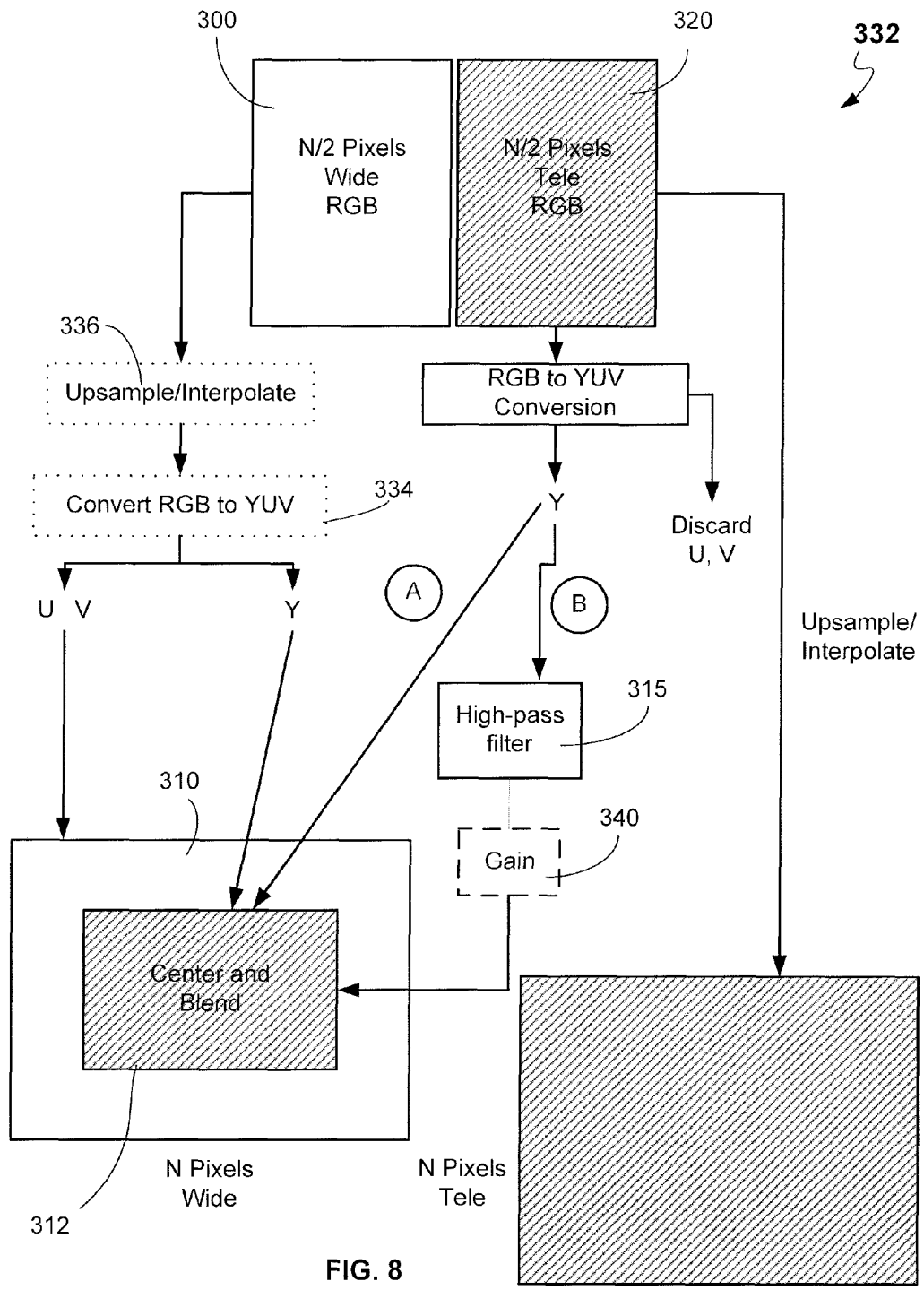
FIG. 8 is a combination block diagram and flow chart illustrating other embodiments of methods for processing and fusing images from a multi-aperture camera.

FIG. 8 illustrates an embodiment of a process 332 for fusing tele and wide images. It relies on the principles described above with reference to FIG. 7, but also takes advantage of the human eye's increased sensitivity to luminance over chrominance with respect to blending of overlap regions of wide and tele images represented by first and second sets of image data, respectively. Using only luminance data allows for a decrease in computational demands for signal processing and fusion algorithms, and may reduce susceptibility to color effects (e.g., color aliasing) at edges. Image sensors often utilize a Red-Green-Blue ("RGB") color filter array ("CFA"), such as a Bayer pattern CFA, for representing a given set of image data as a group using three data subsets corresponding to red, green and blue. There are a number of other available techniques for representing image data as a plurality of image data subsets, and it is often possible to apply well established techniques to convert image data from one representation to another. As one example, in the embodiment exemplified in FIG. 8, both the tele and the wide images are converted from RGB to YUV in a conversion procedure 334. The YUV model defines a set of image data in terms of one luminance (Y) channel and two chrominance channels (U, V), and these channels may each be regarded as subsets of a given set of image data. Then, as in previous examples, the wide image data is upsampled and interpolated in an upsampling procedure 336. The step of upsampling/interpolating data from the wide image may occur before or after conversion of RGB to YUV. Data from the Y channel (luminance) of a tele sub-camera may be optionally high-pass filtered (i.e., option B, as indicated by filtering procedure 315, FIG. 8), as described previously. The resulting high frequency luminance data from the tele image is fused with the low frequency luminance data from the wide image, also as described previously. Optionally, as part of signal processing of the second set of image data, a gain procedure 340 may also be applied to the high frequency data extracted from the tele image prior to fusion with the low frequency data from the wide image. This process is a form of an unsharp mask process. Finally, chrominance data from the wide image may be returned to form a final, blended image. Alternatively, because chrominance data has been discarded from the tele sub-camera in this embodiment, the tele sub-camera may utilize an image sensor that does not have a color filter array. This allows the tele optical sub-system to utilize its entire sensor area to collect luminance data, resulting in even higher image resolution in the overlap region of the fused image. In the example presented above, and as indicated in FIG. 8, chrominance data from the U and V channels (chrominance data), as part of a second set of image data (e.g., the tele image) are discarded as redundant to the U and V data obtained from the wide image. In another embodiment, however, data from the tele U and V channels may be averaged with the U and V data from the wide image to reduce noise.

It is noted that high and/or low pass filtering of a given set of image is considered herein as one way of at least approximately representing the given set of image data based on one or more image data subsets, since applying filtering procedures to the given data set may be regarded as a procedure for dividing the data into different subsets of image data. For example, applying a high pass filter to the given set of image data produces filtered data that may be considered as a subset of the image data, since the filtered data corresponds to the given set of image data and represents only a filtered subset thereof. Also, for a given overlap region represented by at least two sets of overlap image data, the tele image captures both high and low frequency information for that region while the wide image captures only low frequency information. As will be described immediately hereinafter, the unsharp mask process described above can be accomplished using much less computational power by treating the wide image data as a low-pass subset of the tele image data.

Figure 9:
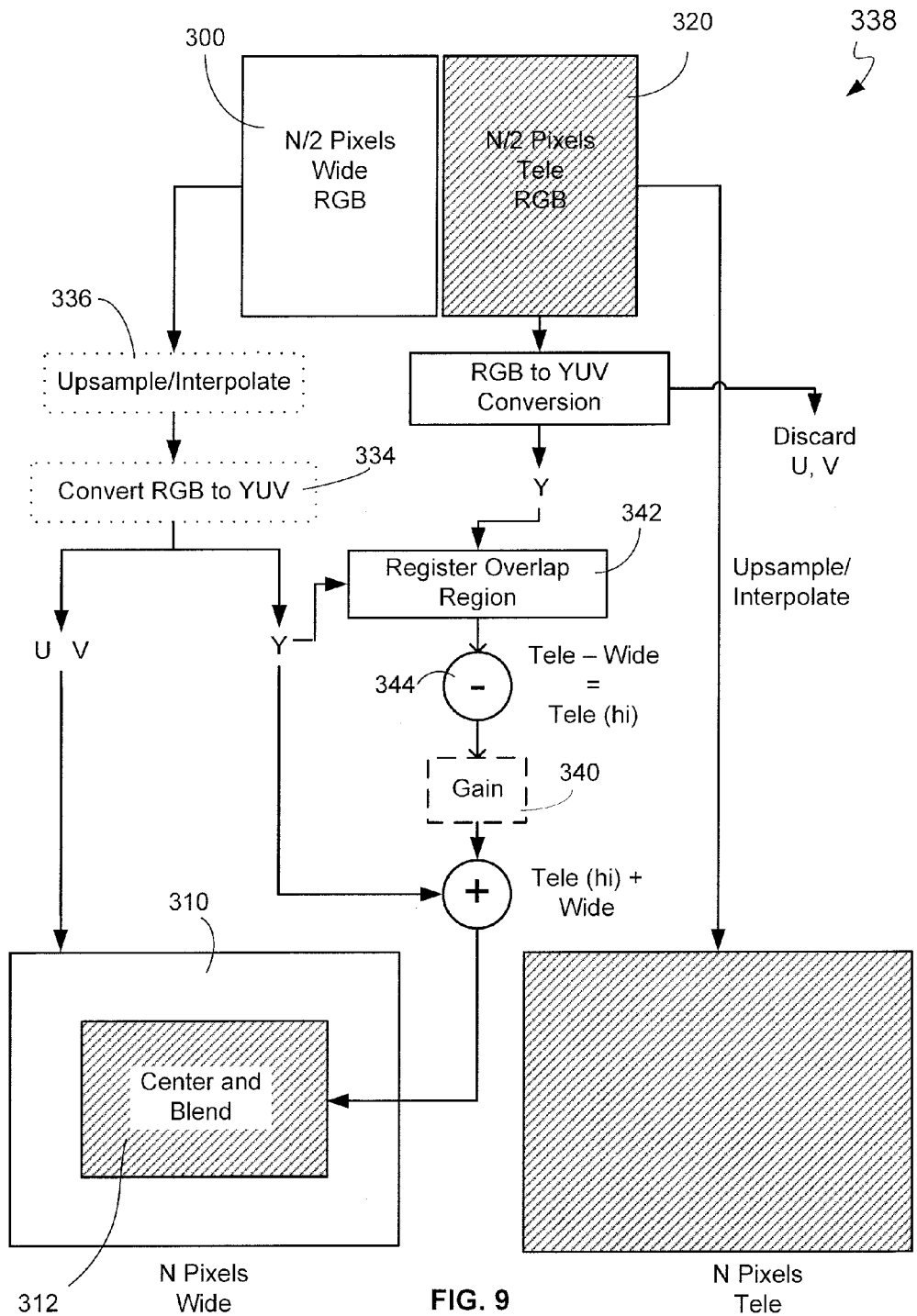
FIG. 9 is a combination block diagram and flow chart illustrating another embodiment for processing and fusing images from a multi-aperture camera.

FIG. 9 schematically illustrates yet another embodiment of a method 338 for image fusion. In method 338, high pass filtering is provided by subtraction of the original wide image signal (discarding interpolated high frequency data) from a tele image signal, after registration at a region of overlap. It is noted that method 338 may be performed in a way that produces results that are substantially the same as those or method 332, FIG. 7 (e.g., applying a high-pass filter to the tele image signal). However, method 338 may be performed without using a computational filtering operation. Method 338 includes what is referred to herein as an "optical-digital high-pass filter." Again, a step of applying a gain 340 to a filtered signal is optional. Based on known digital processing techniques, this subtraction operation may be used in conjunction with the gain operation to optionally replace the high-pass filtering step described above and as illustrated in FIG. 8 when, for example, access to computational power is limited. For example, a subtraction operation requires far less computational power, pixel for pixel, than, for example, applying a 7×7 convolution filter that requires 49 multiplications and 48 additions for each pixel in the overlap region. Process 338 may be thought of as an optical-digital high-pass filter that may be applied either to full color images, or as in the example shown in FIG. 7, to a signal from a luminance channel only. It is noted that an image registration procedure 342 is applied prior to subtraction procedure 344. As described above in reference to FIG. 7, FIG. 2A and FIG. 2B, mechanical alignment between axis 102 of the first camera and axis 103 of the second camera may be of limited precision, and the mechanical alignment may result in a spatial shift between first and second scenes such that the second scene is not perfectly centered within the first scene. It may thus be desirable to compensate for the spatial shift using signal processing techniques to register the two images prior to fusion. Image registration techniques are described in greater detail immediately hereinafter.

While the embodiments herein disclose fusion of tele and wide images produced by a multi-aperture camera, it will be appreciated by those skilled in the art that the processes described and claimed herein can be applied to the fusion of any two images that have image overlap regions but differ in field of view and/or native resolution. It is also contemplated that simply changing the order of certain steps in the processes and methods described herein may result in substantially the same fused images. Such re-ordering of steps thus falls within the scope of the disclosed methods.

Having described systems and methods relating to multi-aperture cameras and image fusion, a number of further details are described below. Attention is again returned to FIG. 2B. As discussed previously above, in multi-aperture camera 100, each of first and second optical sub-systems 110 and 120 is shown imaging onto its own sensor (i.e., sensors 130 and 140, respectively), and additional examples of a multi-aperture camera may include one or more optical sub-systems sharing the same or different regions of a single sensor. Similarly, it may be desirable for each sub-camera, or a group of sub-cameras, to use sensors positioned on different planes. Image sensors suitable for use with multi-aperture camera 100 may include, for example, a CMOS sensor, a CCD array or any other analog or digital array of sensors or sensor media capable of receiving image information from one or more optical sub-systems. Image sensors 130 and 140 may be identical, or may be configured to have different physical, optical or electronic properties. For example, first sensor 130 may be a grayscale sensor for capturing and generating first image data 301 including luminance information corresponding to an object or a scene, while second sensor 140 may be a color sensor for providing second image data 302, including color information about the object or scene. Second sensor 140 may include, for instance, a CFA such as a Bayer filter, or be formed of individual color sensor elements (e.g., RGB or Cyan-Magenta-Yellow ("CMY")). It is noted that a grayscale sub-camera generally produces only a luminance signal (e.g., Y information without U, V chrominance information). Conversely, a color sub-camera produces a color image (e.g., RGB or CMY) that contains both chrominance and luminance information.

Figure 10:
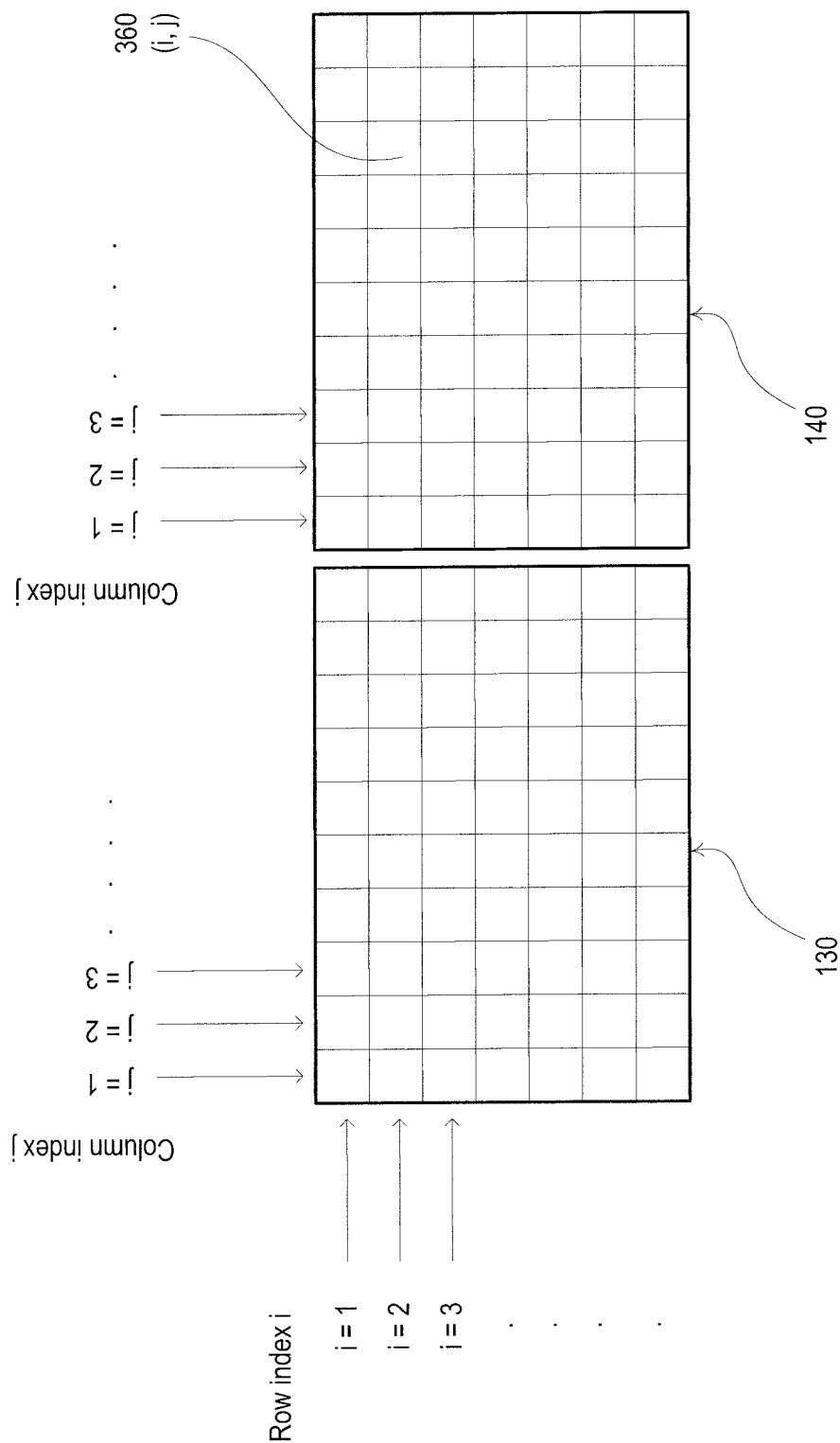
FIG. 10 is a diagrammatic view of a two-dimensional sensor array for use in one embodiment of a multi-aperture camera.

Attention is now directed to FIG. 10 with continued reference to FIG. 2B. A top view of sensors 130 and 140 of FIG. 2B is shown in FIG. 10. In this example, first sensor 130 of FIG. 2B is an array of grayscale pixels, and second sensor 140 of FIG. 2B is an array of color-sensitive pixels. While FIG. 10 is not drawn to scale, and only depicts a limited number of pixels, it illustrates that a position of a given pixel 360 can be described in terms of its position along a row (i) and a column (j) such that each given pixel 360 is associated with a position indicated by a coordinate (i, j). While FIG. 10 depicts grayscale, first sensor 130 and color, second sensor 140 aligned along sensor rows, it is noted that the sensors (or portions of a single sensor shared by multiple optical sub-systems) may be aligned along the columns or offset in some other manner.

Two characteristics of a multi-aperture camera, such as multi-aperture camera 100 of FIG. 2B, may include parallax and a differential sensitivity between a grayscale and a color sub-camera. These characteristics are discussed briefly below.

Due to a separation between first and second sub-cameras 150 and 160 of FIG. 2B, multi-aperture camera 100 may have parallax between a grayscale, luminance image produced by first sub-camera 150 and a color image produced by second sub-camera 160. In other words, because each sub-camera images a given object or feature from a slightly different position, the position of the given object or feature as projected on each sub-camera's sensor may vary. It is noted that parallax is a function of a camera-to-object depth (e.g., distance from the multi-aperture camera 95, FIG. 2B) and therefore, for a three-dimensional object parallax changes across the imaged object. That is, for objects or features at different camera-to-object distances, an image of the object or feature in the first sub-camera may fall on different pixels as compared to an image of the same object or feature in the second sub-camera. When the images are combined, it is desirable in most applications to at least reduce the effects of parallax during image fusion.

Additionally, because substantially all of the light available to a grayscale sub-camera may fall on pixels of its grayscale sensor, the grayscale sub-camera may exhibit higher light sensitivity than a color sub-camera that utilizes a CFA for extracting color information. Moreover, spatial resolution of image data obtained from the grayscale sensor (i.e., image data including luminance information only) may also be higher than spatial resolution of image data in a luminance (Y) channel of the CFA. The higher light sensitivity and higher spatial resolution of the grayscale sub-camera may be exploited by combining the set of image data generated by the grayscale sub-camera with the set of color image data to form a final color image with higher overall image quality, as compared to the set of image data obtained from the color sub-camera alone. Consequently, multi-aperture imaging system 100 may provide advantages such as, but not limited to: 1) improved low-light performance in terms of lower noise levels; 2) higher contrast as a result of the better light-sensitivity of the grayscale sensor; and 3) knowledge of object depth derived from the fusion algorithm and known camera geometries.

While the exemplary embodiment of the multi-aperture camera of FIG. 2B is shown to include two sub-cameras, other numbers and configurations of sub-cameras are possible. For example, three sub-cameras may be arranged in linear or triangular configurations. Four or more sub-cameras may be arranged in a linear manner, or in two or more rows (i.e., horizontal) or columns (i.e., vertical).

Image Registration and Fusion Algorithm

In an embodiment, fusion of image data from a multi-aperture camera may involve addition of color information from a color sub-camera image to luminance information from a grayscale sub-camera image. In another embodiment, a complementary operation may be performed where luminance information from the grayscale sub-camera is added to the color image from the color sub-camera. Due to parallax, one main difference between these two embodiments is that certain objects are spatially shifted in the resulting fused images.

Figure 11:
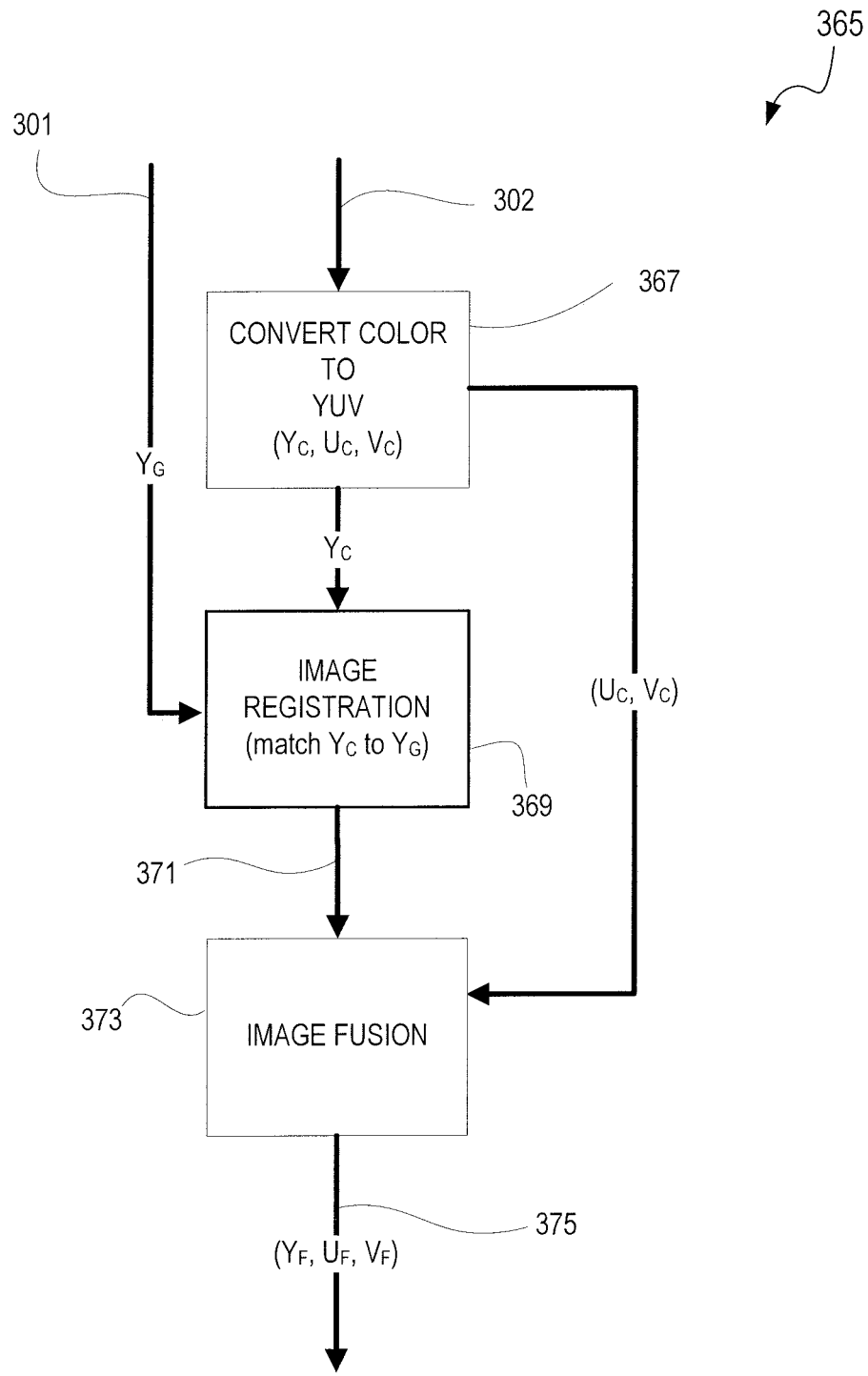
FIG. 11 illustrates one embodiment of a process for registering and fusing image data produced by grayscale and color sub-cameras in a multi-aperture camera.

Attention is now turned to FIG. 11, which illustrates an exemplary process 365 that utilizes processor 166 (see FIG. 3) for fusion of image data 301 and 302 produced, for example, by grayscale and color sub-cameras in a multi-aperture camera system. (It is appreciated that although process 365 and other processes herein are described as operating on image data from a multi-aperture camera system, other embodiments apply such processes to appropriate image data from imaging systems of other types.) In a step 367, a second set of image data 302 from second sub-camera 160 is converted to luminance-chrominance (i.e., YUV channels). Conversion step 367 is necessary due to the fact that, in the present example, image data 301 from first sub-camera 150 is already in the luminance domain; consequently, the color channels (e.g., RGB or CMY) from second sensor 140 are advantageously converted to include a first channel of luminance data (Y) and additional channels of chrominance data (UV) as a part of the image fusion process. We denote the luminance channels of the grayscale and color images as $Y_G$ and $Y_C$, respectively; $(U_G, V_G)$ and $(U_C, V_C)$ denote their corresponding color channels. Note that, in the exemplary embodiment, the $(U_G, V_G)$ channels are effectively zero initially because the grayscale sub-camera collects no chrominance data. Consistent with terminology established above and used throughout this disclosure, each one of the $(Y_G, Y_C, U_C, V_C)$ channels is to be regarded as a subset of its associated set of image data.

Luminance channel $Y_C$ from step 367 is directed to a step 369, where both grayscale and color luminance channels $Y_G$ and $Y_C$ are registered so as to generate registration information 371 (indicated by an arrow). This registration step may utilize a set of basis functions applied to a digital signal in the sampled domain to decompose that signal into image data subsets, including at least two frequency sub-bands in the transform domain, while maintaining localized information about the frequency content. The application of such a function to data in the sampled domain is referred to herein as a localized sampled domain frequency transform ("LSDFT"). One example of a LSDFT is the use of successive convolution filters to apply a series of high pass and low pass filters to decompose an image, initially into high and low frequency sub-bands, then into High/Low ("HL"), High/High ("HH"), Low/Low ("LL") and Low/High ("LH") bands. Another example of a LSDFT is the use of short time Fourier transforms ("STFT") to obtain information about bands of frequencies for a given spatial interval. Another exemplary basis function is the wavelet transform. Consistent with terminology established above, particularly in reference to filtering of image data, any given frequency sub-band, including but not limited to HH, LL, and LH bands, may be regarded as a subset of its associated set of image data, and STFT may be utilized to decompose a given set of image data into subsets of image data.

In one exemplary embodiment, registration step 369 utilizes LSDFT processing in order to determine any disparity between the grayscale and color luminance channels $Y_G$ and $Y_C$ caused by parallax effects. For instance, registration step 369 may determine which group of pixels in image $Y_C$ corresponds to a given group of pixels in image $Y_G$.

Still referring to FIG. 11, registration information 371 generated in registration step 369 is directed to a step 373 where registration information 371 is combined with chrominance information $(U_C, V_C)$ from color image data 302 to form fused set of color image data 375 with $(Y_F, U_F, V_F)$. That is, image fusion step 373 calls corresponding color information from the $(U_C, V_C)$ channels and adds it to the appropriate $(U_G, V_G)$ channels.

In certain applications, it may be desirable to perform some processing of the images prior to or following image fusion step 373 in order to, for instance, improve the fidelity of the fusion and/or reduce artifacts that result from any potential registration errors. For instance, prior to image registration step 369, the $(Y_C, U_C, V_C)$ channels may be scaled prior to processing in order to account for any intensity difference between the two sensors. For example, the data may be scaled by applying gain to a given set of image data. Such intensity matching may be necessary for proper registration of the grayscale and color images in image registration step 369. The matching of the Y channel intensity levels may be performed using a method such as, but not limited to, scaling and gamma correction. Additionally, post processing after image fusion step 373 may be performed, for instance, to ensure that relative color gain stays the same after the image fusion operation. Such additional processing steps are optional.

One advantage of the process illustrated in FIG. 11 resides in enabling estimation of the $(U_G, V_G)$ channels from the $(Y_G, Y_C, U_C, V_C)$ channels while utilizing any known information about any inherent dependence between them. In other words, $(Y_G, Y_C, U_C, V_C)$ channels may be used to estimate the (previously zero) $(U_G, V_G)$ channels, first by utilizing known (or calculated) registration between them, then applying the known color information from the $(U_C, V_C)$ channels, as discussed below.

Image Registration

Image registration may require at least some overlap region between two collections of overlap image data that are to be registered with one another. When this occurs, some feature may be identified in a first collection of overlap image data, and a second collection of overlap image data may be registered with the first collection of overlap image data. In particular, an example of image registration step 369 is discussed in detail immediately hereinafter.

Image registration may be performed utilizing any LSDFT applicable to a given sampled domain. For example, image registration may be performed in the wavelet domain. As another example, image registration may be applied in a transform domain such that at least one of the collections of overlap image data is represented in that transform domain. The wavelet transform includes an inherent property of allowing simultaneous access to localized spatial information and localized frequency content without certain artifacts (e.g., ringing, intensity mismatch, and edge discontinuity) commonly encountered in other block transform methods. As an example, the wavelet transform may be applied in a sliding-window fashion, which may be particularly useful when working in memory-constrained processing environments. The exemplary wavelet transform described herein utilizes Daubechies' 4×4 wavelets [See, I. Daubechies, *Ten Lectures on Wavelets*, SIAM: Society for Industrial and Applied Mathematics; First edition (Jun. 1, 1992)]. Alternatives using higher level wavelets, other families of wavelets (e.g., biorthogonal, Haar, Meyer, and Gabor), or other types of LSFTs are contemplated and are considered as within the scope of embodiments disclosed herein.

Figure 12:
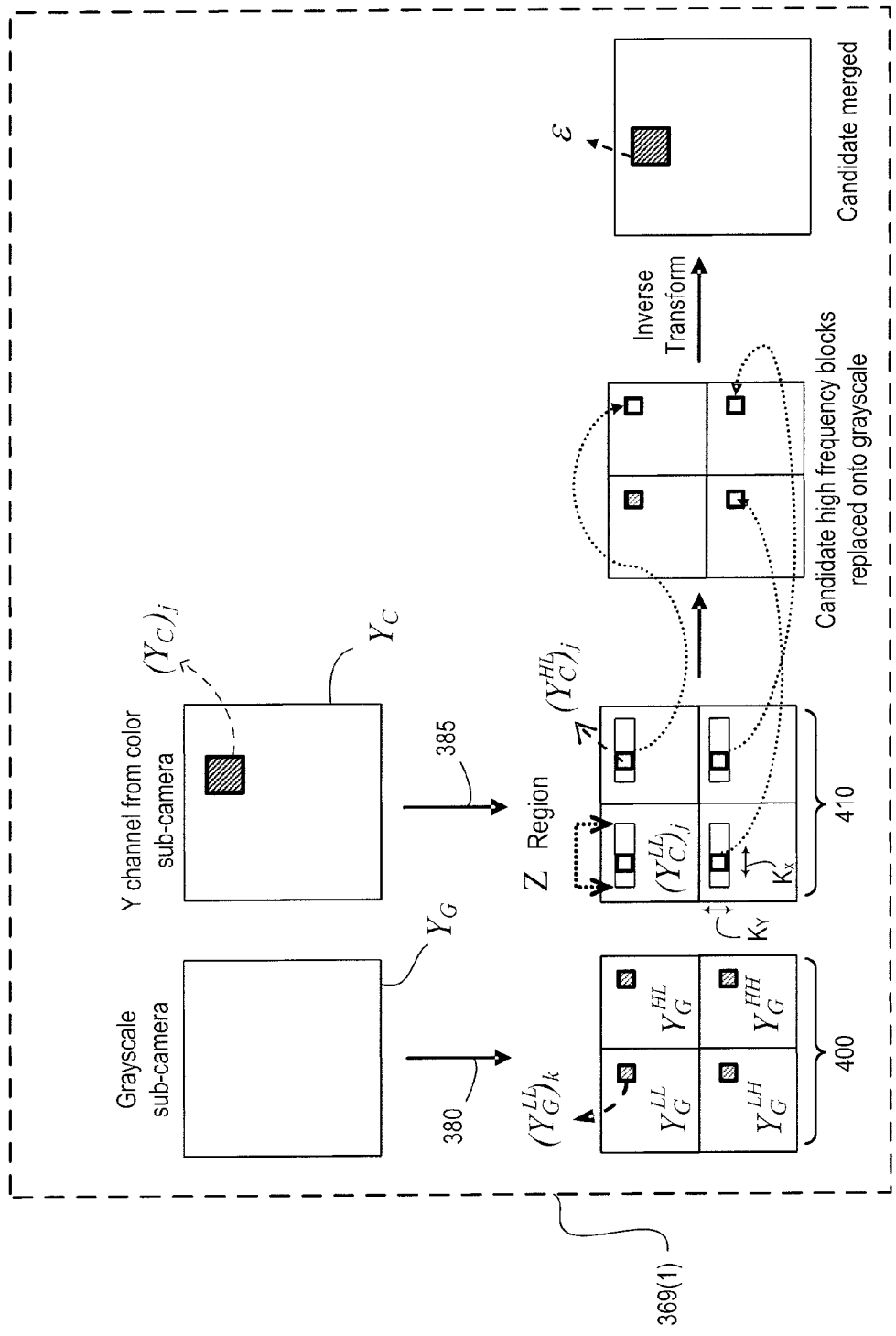
FIG. 12 illustrates one embodiment of a process for registering image data produced by grayscale and color sub-cameras in a multi-aperture camera, in an embodiment.

Attention is now turned to FIG. 12 with ongoing reference to FIG. 2B, FIG. 10 and FIG. 11. FIG. 12 illustrates an exemplary embodiment 369(1) of image registration step 369 (see FIG. 11) implemented with a block-wise sliding window transform. First, forward transforms 380 and 385, respectively, are applied to grayscale and color luminance channels $Y_G$ and $Y_C$. The results of forward transforms 380 and 385 are two groups of dyadic frequency sub-bands denoted 400 ($Y_G^{LL}, Y_G^{HL}, Y_G^{LH}, Y_G^{HH}$) and 410 ($Y_C^{LL}, Y_C^{HL}, Y_C^{LH}, Y_C^{HH}$) for the $Y_G$ and $Y_C$ channels, respectively. The schematic illustrations of the two groups of sub-bands are not drawn to scale. Each one of the ($Y_G^{LL}, Y_G^{HL}, Y_G^{LH}, Y_G^{HH}$) sub bands includes a subset of image data represented in the transform domain and corresponding to the entire block that is illustrated in FIG. 12 and denoted as $Y_G$. Similarly, each one of the ($Y_C^{LL}, Y_C^{HL}, Y_C^{LH}, Y_C^{HH}$) sub-bands includes a subset of image data corresponding to the entire block that is illustrated in FIG. 12 and denoted as $Y_C$. For example, the $Y_G^{LL}$ sub block entirely overlaps and corresponds to the $Y_G$ channel.

Next, the $Y_G^{LL}$ sub-band image may be divided into overlapping or non-overlapping blocks of size $K_X \times K_Y$ (i.e., $K_x$ pixels in an x-direction and $K_Y$ pixels in a y-direction). Note that this division of the sub-band image may not be necessary in practice. However, it is contemplated that a "sliding" transform may be used, that is, the transform may operate on one block at a time and the data needed to generate subsequent blocks may be buffered. A full-frame version is described herein for clarity. A given $k^{th}$ block in the LL sub-band from the $Y_G$ image is denoted in FIG. 12 as $(Y_G^{LL})_k$, and the corresponding blocks in the HL, LH and HH frequency sub-bands are denoted in FIG. 12 as $(Y_G^{HL})_k$, $(Y_G^{LH})_k$, and $(Y_G^{HH})_k$ respectively.

For each "target" block $(Y_G^{LL})_k$, a block in the LL sub-band from the $Y_C$ image corresponding to the same spatial region in object space that is occupied by the target block is identified. This identified block from the $Y_C$ image may be chosen from all sets of possible (overlapping) $K_X \times K_Y$ blocks in $Y_C^{LL}$. With prior knowledge of a spatial relationship between sub-cameras in a multi-aperture camera system (or between other imaging systems that supply the $Y_C$ and $Y_G$ channels) the search region may be greatly reduced. For example, using knowledge of the sub-camera geometry for a multi-aperture camera (e.g., first and second sub-cameras 150 and 160 of FIG. 2B) and its sensor(s) (e.g., first and second sensors 130 and 140 of FIG. 2B), it is possible to estimate a parallax shift between the two or more sub-cameras. For example, an inspection of FIG. 10, which illustrates the sensor orientation for the exemplary arrangement of grayscale and color sensors from FIG. 2B, reveals that any parallax that occurs in this particular multi-aperture camera, occurs in one direction (e.g., along a row of pixels and spanning several columns of the sensors). Because of the position of the grayscale sensor with respect to the color sensor in the exemplary configuration shown in FIG. 10, any parallax for each pixel position (i, j) in $Y_G^{LL}$, if present, would occur at positions (i, j') in $Y_C^{LL}$, where j'≤j. Also, given prior knowledge of the imaging geometry for a given multi-aperture system, it is possible to determine a maximum expected parallax shift from a closest object distance of interest. For example, the maximum expected parallax for closest objects in image space may be P pixels in the wavelet domain. Thus, a search region Z (denoted as the Z region in FIG. 12) may be defined as a block of pixels in $Y_C^{LL}$ whose row indices and maximum column index are the same as those pixels in $(Y_G^{LL})_k$ but whose minimum column index is P pixels less than the smallest column index in $(Y_G^{LL})_k$.

In addition to utilizing prior knowledge of the spatial relationship between sub-cameras (or separate imaging systems), it may be desirable to refine a determination of parallax by identifying at least one spatial feature having a feature position within the first collection of overlap image data, and then searching within the second collection of image data for a related representation of the spatial feature such that the related feature at least approximately corresponds to the identified feature. It is then possible to register the related representation as being associated with the first feature position. This makes it possible to compensate for parallax by changing the first collection of overlap image data by modifying each identified spatial feature based on the related representation thereof. For example, changing the feature may include shifting the associated feature position in order to spatially align it with the related representation. Certain embodiments described below provide examplary techniques for performing such registration.

Still referring to FIG. 12, search region Z may be divided into overlapping $K_X \times K_Y$ blocks. An overlap between these blocks may be chosen as, for example, one pixel. Any such candidate $j^{th}$ block may be denoted as $(Y_C^{LL})_j$ for the LL frequency sub-band of the color channel. The corresponding blocks in the HL, LH and HH color channel frequency sub-bands may be similarly denoted as $(Y_C^{HL})_j$, $(Y_C^{LH})_j$, and $(Y_C^{HH})_j$ respectively. In order to determine which of candidate blocks $(Y_C^{LL})_j$ correspond to target block $(Y_G^{LL})_k$ the following sequence of steps may be performed:

(i) Merge (i.e., project) the high frequency blocks corresponding to low frequency block $(Y_C^{LL})_j$ onto the high frequency blocks corresponding to low frequency block $(Y_G^{LL})_k$. This operation may be performed, for instance, by swapping the blocks $\{(Y_G^{HL})_k, (Y_G^{LH})_k, (Y_G^{HH})_k\}$ with the blocks $\{(Y_C^{HL})_j, (Y_C^{LH})_j, (Y_C^{HH})_j\}$ and performing an inverse transform. Denote the spatial domain block that results from this operation as ϵ.

(ii) Compute an error between ϵ and $(Y_C)_j$, where $(Y_C)_j$ is the $j^{th}$ block in the sampled domain that corresponds to the $j^{th}$ blocks in the transform domain that are used to compute ϵ in step (i). For example, the comparison may utilize a mean squared error ("MSE") operation scaled by the overall block intensity. Other error metrics, such as L1 norm, may be used.

(iii) Steps (i) and (ii) may be repeated for all j values. The block index j* that generates the lowest error may be selected as the block associated with $(Y_G^{LL})_k$.

Figure 13:
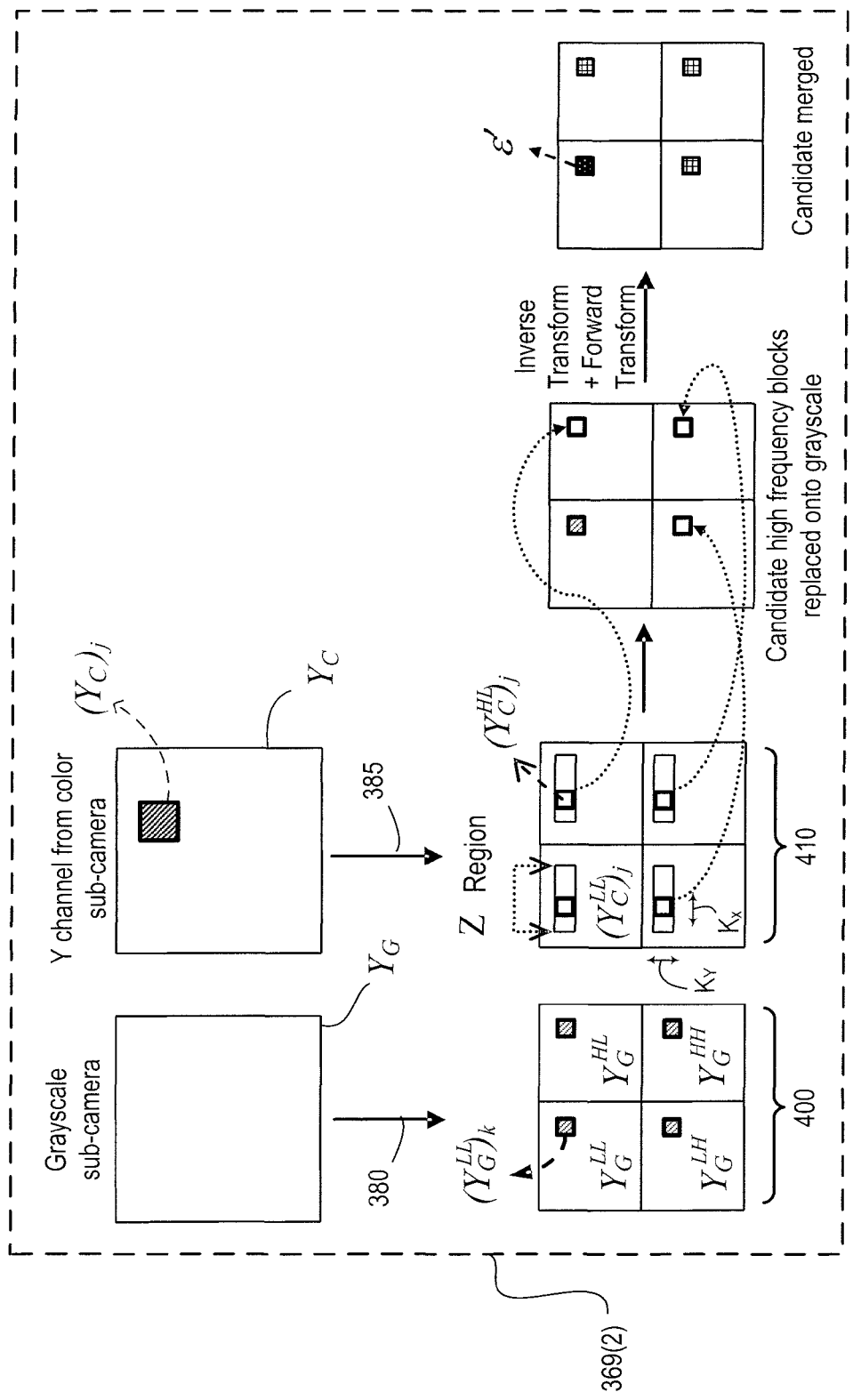
FIG. 13 illustrates one embodiment of a process for fusing registered image data produced by grayscale and color sub-cameras in a multi-aperture camera, in another embodiment.

Attention is now directed to FIG. 13 in conjunction with FIG. 12. FIG. 13 illustrates an embodiment 369(2) of image registration step 369 (see FIG. 11) implemented with a block-wise sliding window transform. The initial processing in this alternative embodiment is substantially the same as illustrated in FIG. 12 and described above and may be performed in the wavelet domain using Daubechies' 4×4 wavelets. For example, the steps of performing a forward transform (e.g., an LSDFT such as a discrete wavelet transform) on both color and grayscale Y channels, defining a "target" block $(Y_G^{LL})_k$, and defining a search region Z are similar to the embodiment illustrated in FIG. 12. Further processing as shown in FIG. 13 may include the following:

(i) Merge (e.g., project) the high frequency blocks corresponding to low frequency block $(Y_C^{LL})_j$ onto the high frequency blocks corresponding to low frequency block $(Y_G^{LL})_k$. Like the process shown in FIG. 12, this operation may be performed, for instance, by swapping the blocks $\{(Y_G^{HL})_k, (Y_G^{LH})_k, (Y_G^{HH})_k\}$ with the blocks $\{(Y_C^{HL})_j, (Y_C^{LH})_j, (Y_C^{HH})_j\}$ and performing an inverse transform, with an additional step of performing a forward transform. Denote the block that results in the LL sub-band at the same location as $(Y_G^{LL})_k$ as ϵ'.

(ii) Compute an error between ϵ' and $(Y_C^{LL})_j$. Again, the error computation may utilize an MSE operation scaled by overall block intensity, or other suitable error metrics, such as L1 norm, may be used.

(iii) Steps (i) and (ii) may be repeated for all j values. The block index j* that generates the lowest error may be selected as the block associated with $(Y_G^{LL})_k$.

As in the embodiment described by FIG. 12, steps (i) and (ii) may be repeated for all j values. The block index j* that generates the lowest error may be selected as the block associated with $(Y_G^{LL})_k$.

Index and error information obtained using either of methods 369(1) and 369(2) described above may be represented, for example, as a "parallax map" and/or an "error map." The error map is a two-dimensional array of error values calculated in step (iii) above for the block selected in step (iv) for each target block processed. The parallax map is a two-dimensional array indicating which index (i, j*) from $Y_C^{LL}$ corresponds to each index (i, j) in $Y_G^{LL}$ and may be represented as pixel offset as a function of image coordinate.

Figure 14:
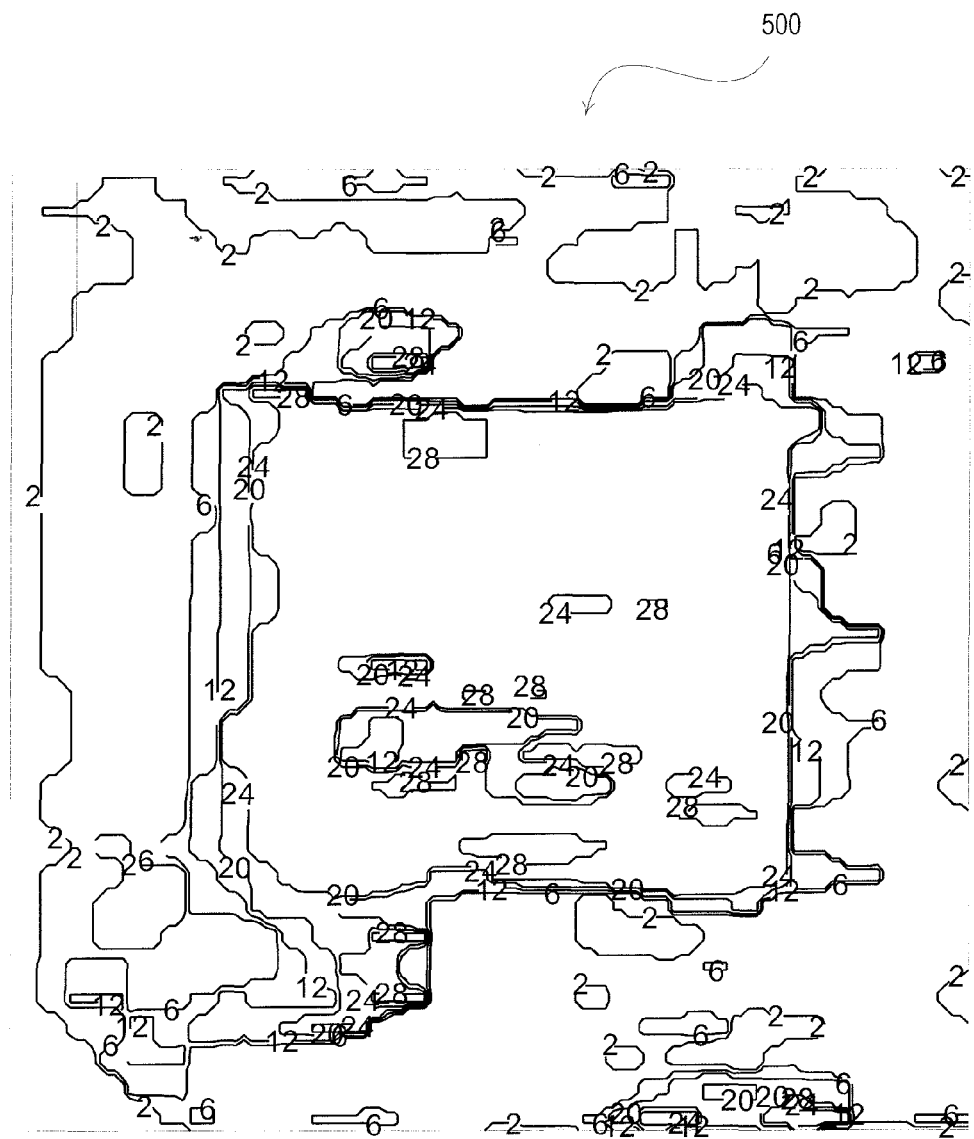
FIG. 14 is a contour plot illustrating the amount of parallax present between objects imaged by grayscale and color sub-cameras in one embodiment of a multi-aperture camera.

Turning now to FIG. 14, an example of such a parallax map is illustrated as a contour plot 500. In this example, two planar objects were imaged with a multi-aperture camera, such as multi-aperture camera 95 of FIG. 2B. One object (at a center of the imaged scene) was placed at an object distance of 60 cm from the multi-aperture camera and the other was placed at an object distance of 1 m (background). Contour plot 500 in FIG. 14 reflects this object composition, showing 22 to 28 pixels of parallax in the center (e.g., associated with the object at 60 cm in the present example) and 2 to 6 pixels of parallax associated with the object at 1 m. With prior knowledge of the geometry for a particular multi-aperture camera, creation of such a parallax map may be used to obtain "ranging" information for objects in an image created using the multi-aperture camera.

In another example, image registration step 369 (FIG. 11) may include a simplified version of the process outlined above. For example, steps (i)-(iii) as described above in connection with step 369(1) (FIG. 12) may be replaced by a simpler process where, instead of computing ϵ, only blocks $(Y_C^{LL})_j$ and $(Y_G^{LL})_k$ are directly compared. In most instances, results of this simplified comparison operation are similar to the results of performing step 369(1). However, with certain objects having high-frequency content, step 369(1) may yield more accurate registration results. This is expected because inspection of only low-frequency sub-bands would "miss" certain registration error that may be present only in the higher spatial frequencies.

Image Fusion

Figure 15:
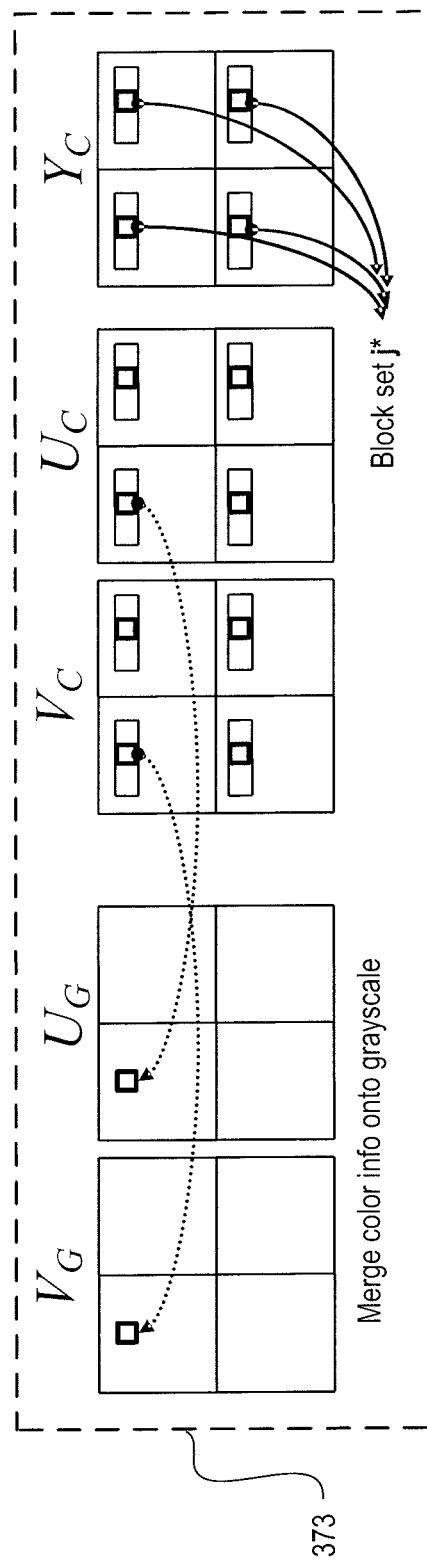
FIG. 15 is a plot comparing cross-sectional intensity changes for grayscale and color sub-cameras in one embodiment of a multi-aperture camera.

Attention is now turned to FIG. 15 in conjunction with FIG. 11. In certain embodiments, image fusion step 373 (see FIG. 11) is integrated within or performed concurrently with registration step 369. However, FIG. 15 illustrates the operation of image fusion component 373 as a stand-alone step. Using registration information computed in image registration step 369, color channels ($U_C$, $V_C$) may be 'merged' onto grayscale channels ($U_G$, $V_G$). This image fusion step may be accomplished utilizing a variety of digital signal processing methods and using some or all of the frequency components of the digital signals. In one embodiment, only low passed color information is used from the color channels. This offers two main benefits: 1) using only low-frequency information may eliminate high-frequency noise components that are inherently more significant in the color image, and thus reduce the total noise in the fused set of image data; and 2) a low-pass smoothing operation may reduce any artifacts that result from registration errors. In the embodiment illustrated in FIG. 15, a wavelet transform may be applied to grayscale and color chrominance channels ($U_C$, $V_C$) and ($U_G$, $V_G$). Subsequently, resulting LL frequency sub-band blocks from ($U_C$, $V_C$) may be assigned (e.g., based on registration information obtained in image registration step 369) onto the LL sub-band of ($U_G$, $V_G$) according to a parallax map generated as described above. In the present example, high-frequency sub-bands may be ignored for the color channels. After the LL frequency sub-band blocks from ($U_C$, $V_C$) are assigned onto the LL sub-band of ($U_G$, $V_G$), an inverse wavelet transform may be applied to the merged Y, U, and V channels to obtain a fused ($Y_F$, $U_F$, $V_F$) image as a fused set of image data, wherein $Y_F=Y_G$ and $U_F$, $V_F$ are subsets of image data that represent the U and V channels from the original color image, registered and assigned onto the LL sub-band of ($U_G$, $V_G$), as discussed above.

A resulting fused set of image data, obtained as described above, may offer improved image quality, for example, in low-light conditions, as compared to a color image captured by a conventional, single aperture imaging system. For example, application of the above-described algorithms to the images produced by a multi-aperture camera may result in a variety of advantages such as, but not limited to: 1) improved low-light performance in terms of lower noise levels; 2) higher-contrast as a result of the better light-sensitivity of the grayscale sensor; and 3) object depth information as a by-product of the aforedescribed image fusion process.

Figure 16:
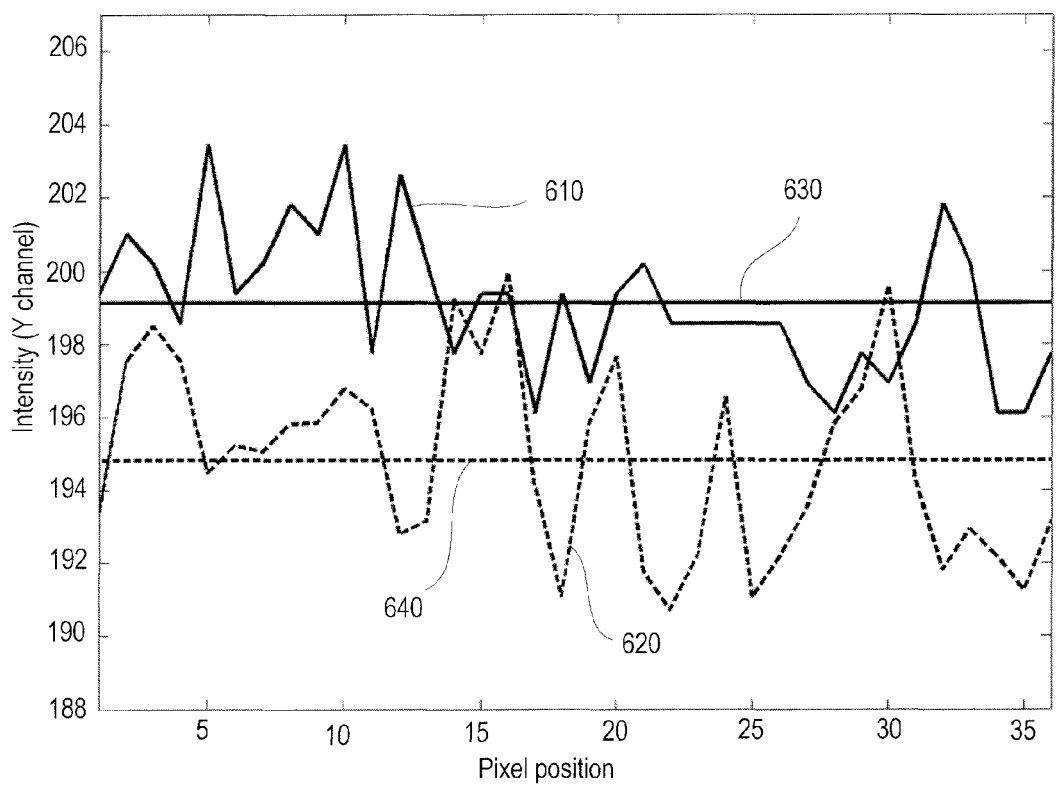
FIG. 16 is a plot comparing cross-sectional contrast changes for grayscale and color sub-cameras in one embodiment of a multi-aperture camera, in an embodiment.

Attention is now turned to FIG. 16. FIG. 16 shows two line plots of luminance (i.e., Y channel) intensity as a function of pixel position for a cross-section (after correction for parallax) for a fused color image and a color sub-camera image. First line plot 610 corresponds to $Y_F$ of fused set of image data 350 (see FIG. 3), and second line plot 620 corresponds to $Y_C$ of color image data 302. A first signal mean 630 (corresponding to fused set of image data 350) is indicated as a solid horizontal line, and a second signal mean 640 (corresponding to color image data 302) is indicated as a dashed horizontal line. In each line plot, variations of the image data around the corresponding mean intensity can be attributed to noise sources in the imaging system. It may thus be seen that first line plot 610 is higher in intensity than second line plot 620, and, based on first and second line plots 610 and 620, that noise is less severe in the luminance channel of the fused set of image data as compared to the luminance channel of the original color image. Signal-to-noise ratio ("SNR") may be used in the example shown in FIG. 16 to quantify the noise reduction for the luminance channel of the fused set of image data from the exemplary multi-aperture camera over the luminance channel of the un-fused, original color image. In the present context, SNR is understood to be the ratio of the signal mean to the signal standard deviation (e.g., due to noise). In the example shown in FIG. 16, the SNR of the luminance channel of the fused set of image data may be calculated to be 100 while the SNR of the luminance channel of the original color image obtained from the color sub-camera is 73.6. These values demonstrate an improvement of over 25% in SNR of the fused set of image data, which amounts to a 2.7 dB improvement.

Figure 17:
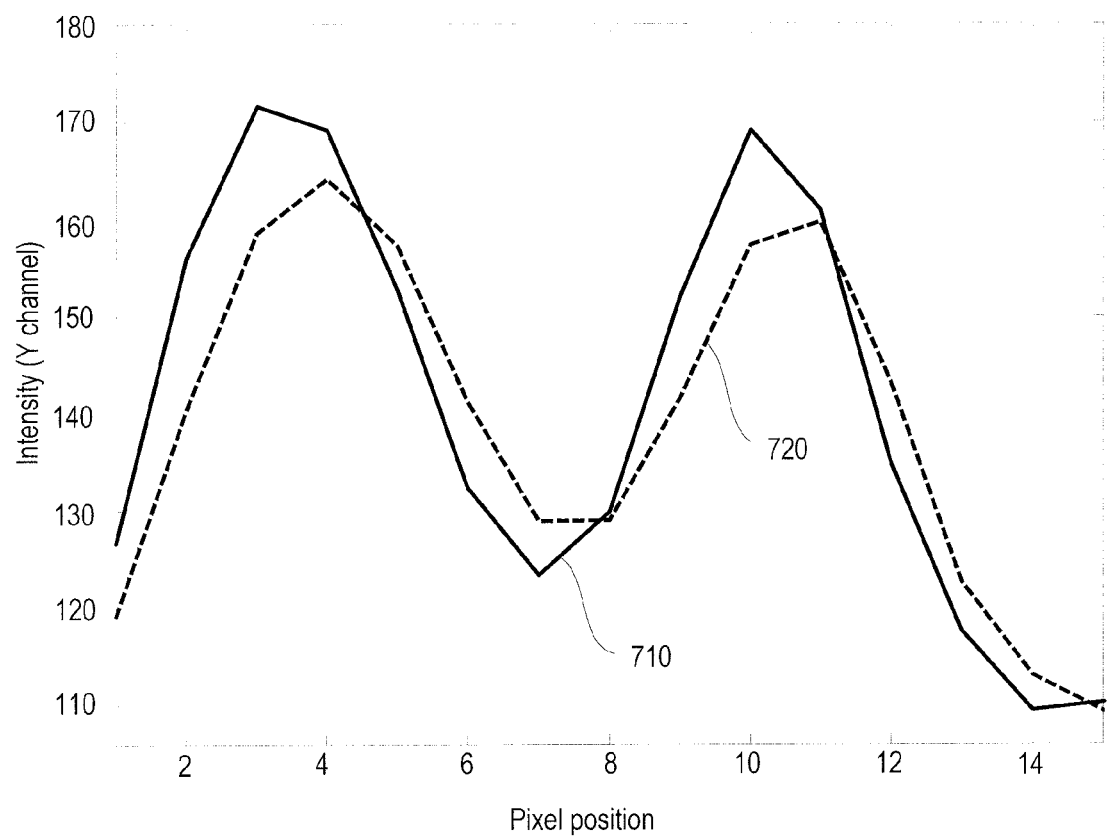
FIG. 17 shows line plots of a cross-section through a dark to bright transition region, in a luminance channel of a color image produced by a color sub-camera before image fusion.

Turning now to FIG. 17, in addition to the noise reduction, the fused set of image data 350 from the exemplary multi-aperture camera also yields a higher contrast compared to the color image produced by the color sub-camera alone. FIG. 17 shows first and second line plots 710 and 720 of a cross-section through a dark to bright transition region from the luminance channel $Y_F$ of the fused color image, and the luminance channel $Y_C$ of the color image produced by the color sub-camera before image fusion, respectively. First and second line plots 710 and 720 provide the necessary data to compute a contrast measure for each of these images. In the context of the present disclosure, the contrast measure M may be defined as:

$$M = \frac{\max(I) - \min(I)}{\max(I) + \min(I)}$$

where I is intensity of the luminance channel. Based on first and second line plots 710 and 720, the contrast measure for the fused image from the exemplary multi-aperture camera is M=0.22, while that for the un-fused, color image from the color sub-camera is M=0.20, thereby demonstrating an improvement of 10% in the fused image over the un-fused color image.

Pre- and Post-Processing Algorithms

Referring briefly again to FIG. 11, a number of additional image processing algorithms may be applied to the digital signals produced by the sub-cameras of a multi-aperture camera. These additional algorithms may be applied prior to, during, or after application of the image registration and fusion steps of FIG. 11, and may result in a higher quality fused set of image data 375. Image processing algorithms that are applied to digital signals prior to image registration step 369 are referred to herein as "pre-processing algorithms". Algorithms that are applied after image fusion step 373 are referred to herein as "post-processing algorithms".

One example of a pre-processing algorithm is edge enhancement. While enhancing edges (i.e., areas of high spatial frequency) may result in a higher MSE for registration errors than an MSE calculated without edge enhancement, the effect may be desirable in certain applications. One method of edge enhancement involves increasing contrast of the images. Suitable methods include, for instance, high pass boost and application of an unsharp mask. Methods for increasing contrast include, but are not limited to, application of a gamma curve to the intensity levels in the Y channels, and/or application of histogram stretch. In certain applications, if contrast is increased in pre-processing, it may be necessary to reverse this operation prior to an image fusion step.

One example of an image processing algorithm that may be applied between the image registration and image fusion steps is a filtering operation to correct for localized errors in the parallax map created during image registration step 369. Such localized errors may be caused by noise and can be removed, or reduced, using a filtering operation applied to the parallax map prior to image fusion step 373. For example, a filter may be selected to remove isolated sparse registration errors. One such filtering operation may be achieved, for instance, using median filtering. Other filtering operations suitable for removal of noise in the parallax map include the application of band-pass filters.

Additionally, examination of the error map generated at image registration step 369 may yield information about the fidelity of the registration operation. By comparing the errors to some predetermined or adaptively computed threshold, an additional algorithm may be utilized to decide whether or not to "color" a certain wavelet block. This additional algorithm may be particularly useful in the presence of occluded regions, where there are objects visible in the grayscale image data that are not visible in the color image data due to parallax effects, which results in that object having no corresponding color information. In such regions, the calculated MSE may be higher than other, non-occluded areas and, consequently, the additional algorithm may be configured such that application of the algorithm does not add color in occluded regions.

Also, it should be noted that the scaling of the chrominance (i.e., U and V) channels of the color image from the color sub-camera system to the chrominance channels of the grayscale image in step 367 should be performed with care. For example, since color saturation is a function of the corresponding intensity level, adaptive scaling of the chrominance channels may be desirable during fusion in order to ensure good color fidelity.

While the examples described in this disclosure relate to the fusion of images produced by a multi-aperture camera having color and grayscale sub-cameras, it will be appreciated by those skilled in the art that the processes described and claimed herein may be applied to the fusion of any two or more images that have image overlap regions, whether produced by a multi-aperture camera system or by other imaging means. In addition, the examples described herein are applications of a localized transform to a digital signal in which the sampled domain is the spatial domain. It is recognized herein that such localized transforms may be applied to digital signals having other sampled domains such as, but not limited to, the temporal domain. Application of the methods described herein to such images may thus be considered to fall within the scope of the disclosed embodiments. It should thus be noted that the matter contained in the above description or shown in the accompanying drawings should be interpreted as illustrative and not a limiting sense.

What is claimed is:

1. A method for image data fusion, comprising:
   receiving a first set of image data as at least one first data channel and
   corresponding to a first imaged first scene;
   receiving a second set of image data as at least one second data channel and
   corresponding to a second imaged second scene that at least partially overlaps said first scene in an overlap region,
   converting at least a portion of the first set of image data corresponding to the overlap region from at least one of the at least one first data channels formats into a plurality of first frequency subsets within a transform domain by applying a first forward transformation;
   converting at least a portion of the second set of image data corresponding to the overlap region from at least one of the at least one second data channels into a plurality of second frequency subsets within the transform domain by applying a second forward transformation; and
   producing a fused set of image data by replacing at least one of the plurality of first frequency subsets with a corresponding at least one of the plurality of second frequency subsets of a selected second data channel;
   wherein:
   each of the plurality of first and second frequency subsets correspond to one of a plurality of frequency sub-bands, and
   the converting and receiving steps are performed by an image processor, and
   the step of converting the second set includes filtering at least the data from the selected second data channel corresponding to the overlap region, and
   the first set of image data is received from a color camera and the second set of image data is received from a grayscale camera.

2. The method of claim 1 wherein
   the at least one first data channel includes a first luminance channel and the at least one second data channel includes a second luminance channel;
   the steps of converting include applying the first and second forward transformations to the first and second luminance channels to produce a plurality of first and second luminance frequency subsets, respectively; and
   the step of producing includes replacing at least one of the plurality of first luminance frequency subsets with a corresponding portion of the plurality of second luminance frequency subsets.

3. The method of claim 2 wherein the second luminance channel is a grayscale channel.

4. The method of claim 1 wherein filtering at least the portion of the second set includes high-pass filtering the portion of the second set such that high-pass filtered data forms the portion of the second frequency subsets from the selected second data channel.

5. The method of claim 1 wherein filtering the portion of the second set includes convolution filtering the second set of image data.

6. The method of claim 1 wherein converting the second set of image data includes scaling said second set of image data.

7. The method of claim 6 wherein
receiving the second set of image data includes providing intensity information as part of the second set of image data, and
scaling said second set of image data includes changing at least some of said intensity information.

8. The method of claim 7 wherein scaling said second set of image data includes applying a gain to said intensity information.

9. The method of claim 1 wherein
receiving said first set of image data includes establishing a first level of zoom with respect to said first scene, and
receiving said second set of image data includes establishing a second level of zoom with respect to said second scene that is greater than said first level of zoom.

10. The method of claim 9 wherein establishing the first and second levels of zoom causes said first set of image data to have first angular frequency information based at least in part on said first level of zoom, and causes said second collection of overlap image data to have second angular frequency information based at least in part on said second level of zoom, and said second angular frequency information represents a higher angular frequency than said first angular frequency information.

11. The method of claim 10 wherein receiving the first set of image data includes
receiving an initial set of image data and
producing said first set of image data from the initial set of image data by upsampling said initial set of image data to increase the angular frequency represented in said first set of image data to a target angular frequency.

12. The method of claim 11 wherein
receiving said initial set of image data generates a group of initial data points, and
upsampling causes the first set of image data to include (i) said group of initial data points and (ii) an additional number of data points produced by interpolating between the initial data points for assigning values for each of the additional of data points.

13. The method of claim 11 wherein said upsampling includes matching said increased angular frequency to said second angular frequency such that the target angular frequency of the first set of image data is at least approximately equal to said second angular frequency.

14. The method of claim 13 wherein replacing the at least one of the plurality of first frequency subsets additionally includes blending said portion of the plurality of second frequency subsets with said at least one of the plurality of first frequency subsets such that at least a majority of said fused image data exhibits a resulting angular frequency that is at least approximately equal to said second angular frequency.

15. The method of claim 1 wherein receiving the first set of image data includes providing said first image data as first, second and third data channels, and converting said first set includes converting the first, second and third data channels to a different set of three data channels.

16. The method of claim 15 wherein receiving said first set of image data includes providing said first, second and third channels as R, G and B channels, respectively, and converting the first, second and third data channels includes converting the R, G and B channels to Y, U and V channels.

17. The method of claim 1 wherein receiving the second set of image data includes providing said second set of image data as first, second and third channels, converting said second set of image data includes converting the second set of image data to a different set of three channels, each of which different channels forms one of said plurality of image data subsets.

18. The method of claim 17 wherein receiving said second set of image data includes providing said first, second and third channels as R, G, and B channels, and converting the second set of image data includes converting the R, G and B channels to a different set of three channels including Y, U and V channels.

19. The method of claim 18 including selecting said Y channel as the at least one of the at least one second data channels.

20. The method of claim 1 including modifying said second set of image data by subtracting therefrom said first set of image data.

21. The method of claim 1 wherein producing the fused set of image data includes converting the merged data set from the transform domain by applying thereto at least one of (i) a forward transformation and (ii) an inverse transformation.

22. The method of claim 1 wherein producing the fused set of image data further includes:
identifying at least one spatial feature that is present at a feature position within the first set of image data corresponding to the overlap region, as an identified spatial feature;
identifying a related representation of each such identified spatial feature, in the selected second data channel, such that each related representation at least approximately corresponds to one of the identified spatial features;
registering a selected related representation as corresponding with a feature position of the corresponding identified spatial feature; and
wherein replacing the at least one of the plurality of first frequency subsets includes first modifying at least one identified spatial feature within the first data set based on the corresponding related representation of that feature within the second data set.

23. The method of claim 22 wherein the related representation has a related feature position within the selected second data channel, and identifying the related representation includes identifying a non-zero spatial shift between said related feature position and said feature position.

24. The method of claim 23 wherein identifying said spatial shift includes determining that the spatial shift is caused by parallax between first and second sub-cameras that provide the first and second sets of image data, respectively.

25. The method of claim 22 further including
defining a reference block overlying said feature position and having a shape that overlies a reference portion of said first set of image data, corresponding to the overlap region, such that the reference portion of image data represents said spatial feature, and
defining a search region within the subsets from the selected second data channel,
designating a plurality of candidate blocks within the search region, each of which overlies an associated portion of the selected data channel at a candidate position therein,
wherein said identifying includes
determining a degree of correspondence between (i) the reference portion of image data overlaid by the reference block and (ii) the portion of the selected second data channel associated with each of the plurality of candidate blocks, and selecting one of the candidate blocks, based on the degree of correspondence, that exhibits the highest degree of correspondence among the candidate blocks.

26. The method of claim 25 wherein designating the plurality of candidate blocks includes defining a first candidate block and a second candidate block that partially overlap one another.

27. The method of claim 25 wherein registering the selected related representation includes associating the candidate position of the selected candidate block with the feature position, and modifying the at least one identified spatial feature includes changing the reference portion of data based on at least some of the portion of data associated with the selected candidate block.

28. The method of claim 27 wherein generating the first set of image data includes receiving a set of initial image data and producing said first set of image data from the initial image data by applying a first forward transformation to at least a portion of said initial image data, such that said first set of image data is transformed data in a transform domain, and wherein said representing the second collection of overlap image data includes applying a second forward transformation to at least some of said second set of image data such that the characteristic of the second collection of overlap image data is represented in said transform domain, and the selected image data subset is a transformed data subset.

29. The method of claim 1, further comprising configuring a first sub-camera to provide the first set of image data corresponding to a first field of view;

configuring a second sub-camera to provide the second set of image data corresponding to a second field of view; and arranging an overlap of the first and second fields of view, to generate the overlap region.

30. The method of claim 29, wherein configuring the second sub-camera includes supplying the second sub-camera as a grayscale camera that provides at least a luminance channel.

31. The method of claim 29 wherein configuring the first sub-camera includes providing a first sensing surface characterized by a first transverse width, and orienting said first sensing surface for receiving the imaged first scene to generate the first set of image data, and configuring the second sub-camera includes providing a second sensing surface characterized by a second transverse width, and orienting said second sensing surface for receiving the imaged second scene to generate the second set of image data.

32. The method of claim 29 wherein configuring the first sub-camera includes establishing a first focal length for the first sub-camera, and configuring the second sub-camera includes establishing a second focal length for the second sub-camera, the first and second focal lengths being different from one another.

33. The method of claim 32 wherein establishing the first focal length causes the first set of image data to exhibit a first level of zoom with respect to said first scene, and establishing the second focal length causes the second set of data to exhibit a second level of zoom with respect to said second scene that is greater than said first level of zoom.

34. The method of claim 32 wherein receiving the first set of image data includes generating said first set of image data with a first angular frequency based at least in part on said first focal length, and said providing the second set of image data includes generating said second set of image data with a second angular frequency based at least in part on said second focal length, and said second angular frequency is higher than said first angular frequency.

35. The method of claim 29 wherein configuring the first sub-camera includes furnishing said first sub-camera with a first sensor region having a first sensing surface, and aligning the first sensor region such that said imaging of said first scene includes projecting an image of said first scene onto said first sensing surface such that said first sensor region generates said first set of image data, and configuring the second sub-camera includes furnishing said second sub-camera with a second sensor region having a second sensing surface, and aligning the second sensor region such that said imaging of said second scene includes projecting an image of said second scene onto said second sensing surface such that said second sensor region generates said second set of image data.

36. The method of claim 35 wherein furnishing said first sub-camera with said first sensor region having said first sensing surface, and furnishing said second sub-camera with said second sensor region having said second sensing surface includes supplying the first and second sensing surfaces with sensing surface shapes and surface areas that substantially correspond with one another.

37. The method of claim 35 wherein furnishing said first sub-camera with said first sensor region having said first sensing surface, and furnishing said second sub-camera with said second sensor region having said second sensing surface, include supplying the first and second sensing surfaces as portions of a single image sensor chip.

38. The method of claim 1 wherein:

the first and second frequency subsets each include at least a low frequency block and a high frequency block, and replacing the at least one of the plurality of first frequency subsets includes replacing the high frequency block of the first subset with the corresponding high frequency block of the second subset.

39. The method of claim 1 wherein:

the first and second frequency subsets each include at least a low frequency block and a high frequency block, and replacing the at least one of the plurality of first frequency subsets includes replacing the low frequency block of the first subset with the corresponding low frequency block of the second subset.

* * * * *

UNITED STATES PATENT AND TRADEMARK OFFICE
CERTIFICATE OF CORRECTION

PATENT NO.        : 8,824,833 B2                                  Page 1 of 1
APPLICATION NO.   : 12/865343
DATED             : September 2, 2014
INVENTOR(S)       : Joseph C. Dagher et al.

It is certified that error appears in the above-identified patent and that said Letters Patent is hereby corrected as shown below:

On the Title page after item (65) insert        --Related U.S. Application Data
(60) Provisional application No. 61/025,533, filed on Feb. 1, 2008,
provisional application No. 61/051,338, filed on May 7, 2008,
provisional application No. 61/059,319, filed on June 6, 2008.--.

In the Specification

Column 4, Line 2, "scene, and the first" should read --scene, and the second--.
Column 4, Line 4, "causes" should read --cause--.
Column 4, Line 23, "additional of data" should read --additional data--.
Column 5, Line 11, "data least" should read --data at least--.
Column 7, Line 44, "object) The" should read --object). The--.
Column 11, Line 29, "2A and 1B," should read --2A and 2B,--.
Column 14, Line 26, "image" should read --images--.
Column 14, Line 49, "those or" should read --those--.
Column 21, Line 34, "error" should read --errors--.

In the Claims

Column 25, Line 47, "additional of data" should read --additional data--.

Signed and Sealed this
Twenty-fourth Day of February, 2015

Michelle K. Lee
*Deputy Director of the United States Patent and Trademark Office*

UNITED STATES PATENT AND TRADEMARK OFFICE
CERTIFICATE OF CORRECTION

| | | |
|---|---|---|
| PATENT NO. | : 8,824,833 B2 | Page 1 of 1 |
| APPLICATION NO. | : 12/865343 | |
| DATED | : September 2, 2014 | |
| INVENTOR(S) | : Dagher et al. | |

It is certified that error appears in the above-identified patent and that said Letters Patent is hereby corrected as shown below:

On the Title Page:

The first or sole Notice should read --

Subject to any disclaimer, the term of this patent is extended or adjusted under 35 U.S.C. 154(b) by 719 days.

Signed and Sealed this
Nineteenth Day of April, 2016

Michelle K. Lee
*Director of the United States Patent and Trademark Office*